(12) United States Patent
Maheswaranathan

(10) Patent No.: US 11,234,111 B2
(45) Date of Patent: *Jan. 25, 2022

(54) SYSTEMS AND METHODS FOR IMPROVING ALERT MESSAGING USING DEVICE TO DEVICE COMMUNICATION

(71) Applicant: Hand Held Products, Inc., Fort Mill, SC (US)

(72) Inventor: Gaithri Maheswaranathan, Greater London (GB)

(*) Notice: Subject to any disclaimer, the term of this patent is extended or adjusted under 35 U.S.C. 154(b) by 0 days.

This patent is subject to a terminal disclaimer.

(21) Appl. No.: 16/782,712

(22) Filed: Feb. 5, 2020

(65) Prior Publication Data

US 2020/0178059 A1   Jun. 4, 2020

Related U.S. Application Data

(63) Continuation of application No. 15/981,459, filed on May 16, 2018, now Pat. No. 10,602,339.

(Continued)

(51) Int. Cl.
*H04W 4/90* (2018.01)
*H04W 64/00* (2009.01)
(Continued)

(52) U.S. Cl.
CPC .......... *H04W 4/90* (2018.02); *H04M 1/72424* (2021.01); *H04W 4/021* (2013.01); *H04W 4/029* (2018.02); *H04W 64/006* (2013.01); *H04M 1/72421* (2021.01); *H04M 1/72436* (2021.01); *H04M 1/72457* (2021.01)

(58) Field of Classification Search
CPC . H04W 4/90; H04W 64/006; H04M 1/72538; H04M 1/72552; H04M 1/72541
See application file for complete search history.

(56) References Cited

U.S. PATENT DOCUMENTS 6,243,039 B1 * 6/2001 Elliot ............... G01S 19/16
342/357.74
8,604,925 B2   12/2013 Monte et al.
(Continued)

OTHER PUBLICATIONS

Final Rejection dated Jul. 12, 2019 for U.S. Appl. No. 15/981,459.
(Continued)

*Primary Examiner* — Minjung Kim
(74) *Attorney, Agent, or Firm* — Alston & Bird LLP

(57) ABSTRACT

A method, apparatus and computer program product are provided in accordance with an example embodiment in order to initiate a message and communication on behalf of one or more tracking devices or initiate a request for location information associated with one or more tracking devices. In the context of a method, the method includes pairing at least a first device with at least one tracking device that is associated with a user; wherein the first device is configured to interact with the at least one tracking device. The method further includes detecting an alert condition with respect to the at least one tracking device and initiating a message request to the at least one tracking device. The method further includes causing an alert message comprising the location information associated with the at least one tracking device to be transmitted.

20 Claims, 12 Drawing Sheets

Related U.S. Application Data

(60) Provisional application No. 62/507,759, filed on May 17, 2017.

(51) Int. Cl.
*H04M 1/725* (2021.01)
*H04W 4/021* (2018.01)
*H04W 4/029* (2018.01)
*H04M 1/72424* (2021.01)
*H04M 1/72421* (2021.01)
*H04M 1/72436* (2021.01)
*H04M 1/72457* (2021.01)

(56) References Cited

U.S. PATENT DOCUMENTS

| | | | | |
|---|---|---|---|---|
| 8,610,007 B2* | 12/2013 | Chen | ............... | G01G 19/52 |
| | | | | 177/25.13 |
| 10,602,339 B2 | 3/2020 | Maheswaranathan | | |
| 2004/0046667 A1* | 3/2004 | Copley | ............... | G08B 21/0286 |
| | | | | 340/573.4 |
| 2004/0155772 A1 | 8/2004 | Medema et al. | | |
| 2005/0068169 A1* | 3/2005 | Copley | ............... | G08B 21/0283 |
| | | | | 340/539.13 |
| 2012/0015621 A1 | 1/2012 | Cerny et al. | | |
| 2012/0072038 A1* | 3/2012 | Kolar | ............... | G06F 1/3203 |
| | | | | 700/291 |
| 2012/0209507 A1* | 8/2012 | Serbanescu | ............ | G01C 21/04 |
| | | | | 701/410 |
| 2013/0143519 A1 | 6/2013 | Doezema | | |
| 2014/0235171 A1* | 8/2014 | Molettiere | ............ | H04W 8/005 |
| | | | | 455/41.2 |
| 2015/0258961 A1* | 9/2015 | Doherty | ............. | B60R 25/1012 |
| | | | | 701/2 |
| 2016/0105923 A1* | 4/2016 | Chen | ............... | G06F 3/017 |
| | | | | 455/41.2 |
| 2017/0140630 A1 | 5/2017 | Brasch et al. | | |
| 2017/0171703 A1 | 6/2017 | Maheswaranathan | | |
| 2017/0171803 A1 | 6/2017 | Maheswaranathan | | |
| 2018/0266838 A1* | 9/2018 | Buvid | ............... | G08G 1/207 |

OTHER PUBLICATIONS

Non-Final Rejection dated Dec. 17, 2018 for U.S. Appl. No. 15/981,459.
Notice of Allowance and Fees Due (PTOL-85) dated Nov. 6, 2019 for U.S. Appl. No. 15/981,459.

* cited by examiner

SYSTEMS AND METHODS FOR IMPROVING ALERT MESSAGING USING DEVICE TO DEVICE COMMUNICATION

CROSS-REFERENCE TO RELATED APPLICATIONS

This application is a continuation application of U.S. patent application Ser. No. 15/981,459, filed on May 16, 2018, which claims the benefit of U.S. Provisional Patent Application No. 62/507,759, filed May 17, 2017, the entire contents of which are incorporated by reference herein.

TECHNOLOGICAL FIELD

The present invention relates to wireless device-based communication, and more specifically, to a personal tracking device connected to a monitoring, master or action initiated device or a combination of such devices, the monitoring device, master device, action initiated device(s) can provide an emergency or location signal on behalf of the personal tracking device. The emergency or location signal comprises an SOS, location information such as latitude and longitude information, alert information associated with the tracking device, and/or the like.

BACKGROUND

There have been many incidents with tragic consequences where individuals, such as miners or drillers who may be drilling and/or digging the middle of a mountain which may be volcanic and cause exposure to a toxic gas environment, are often lost or badly injured because the lone worker/miner/driller is unaware or is unable to communicate their current location, much less contact an emergency rescue unit. In many cases, such as when mining an active volcano, the ability of miners to effectively communicate their status and location is often critical to their safety and the safety of their peers working in the same area or within close proximity. In some examples, clouds of sulfur are very thick and can lead to coughing fits or even loss of consciousness such that these miners are unable to call for help and/or accurately communicate their location in emergency situations.

At the same time, the inventor has discovered other latent and unmet needs stemming from the nature of sending information from an individual, involved in an accident or an individual who has reached a particular destination, to another device or a control monitoring system. The traditional emergency notification and communication means involves tracking devices which continuously send their status and location information to a monitoring control system or another device, but these methods suffer from the cost of expensive airtime tariffs. The inventor has identified that sending such informational messages on behalf of the tracking device via a master or monitoring device or devices could in many instances improve communication and provide precision location identification. Thus, there remains an unmet need for a solution that can avoid the reliance on costly and ineffective messaging means while enabling improved communication and location determination.

BRIEF SUMMARY

A method, apparatus and computer program product are provided in accordance with an example embodiment in order to initiate a message and communication on behalf of one or more tracking devices or initiate a request for location information associated with one or more tracking devices. In the context of a method, the method includes pairing at least a first device with at least one tracking device that is associated with a user; wherein the first device is configured to interact with the at least one tracking device based on one more commands provided via at least one of application and firmware executing on the first device. The method further includes detecting an alert condition with respect to the at least one tracking device and initiating a message request to the at least one tracking device. The method of initiating the message request includes determining recipients for the message request, wherein in the recipients comprise emergency services; sending the message request to the at least one tracking device through a preprogrammed wireless technology; and receiving location information associated with the at least one tracking device. The method further includes causing an alert message comprising the location information associated with the at least one tracking device to be transmitted to the recipients on behalf of the at least one tracking device.

In some example embodiments, an apparatus is disclosed. The apparatus includes at least one processor; and at least one memory including computer program code for one or more programs, the at least one memory and the computer program code configured to, with the at least one processor, cause the apparatus to pair at least a first device with at least one tracking device; wherein the first device is configured to interact with the at least one tracking device based on one more commands provided via at least one of application and firmware executing on the first device. The processor is further configured to initiate a message request to the at least one tracking device, wherein to initiate the message, determine recipients for the message request, wherein in the recipients comprise emergency services; send the message request to the at least one tracking device through a preprogrammed wireless technology; and receive location information associated with the at least one tracking device. The processor is further configured to cause an alert message comprising the location information associated with the at least one tracking device to be transmitted to the recipients on behalf of the at least one tracking device.

In some example embodiments, an apparatus is disclosed. The apparatus includes means for pairing at least a first device with at least one tracking device that is associated with a user; wherein the first device is configured to interact with the at least one tracking device based on one more commands provided via at least one of application and firmware executing on the first device. The apparatus further includes means for initiating a message request. The apparatus further includes means for causing an alert message comprising the location information associated with the at least one tracking device to be transmitted to the recipients on behalf of the at least one tracking device.

In some examples, computer program product is disclosed. The computer program product includes at least one non-transitory computer-readable storage medium having computer-executable program code portions stored therein, the computer-executable program code portions comprising program code instructions for pairing at least a first device with at least one tracking device that is associated with a user; wherein the first device is configured to interact with the at least one tracking device based on one more commands provided via at least one of application and firmware executing on the first device. The computer-executable program code portions further comprises program code instructions for initiating a message request. The computer-executable program code portions further comprises program code instructions for causing an alert message comprising the location information associated with the at least one tracking device to be transmitted to the recipients on behalf of the at least one tracking device.

BRIEF DESCRIPTION OF THE DRAWINGS

Figure 1:
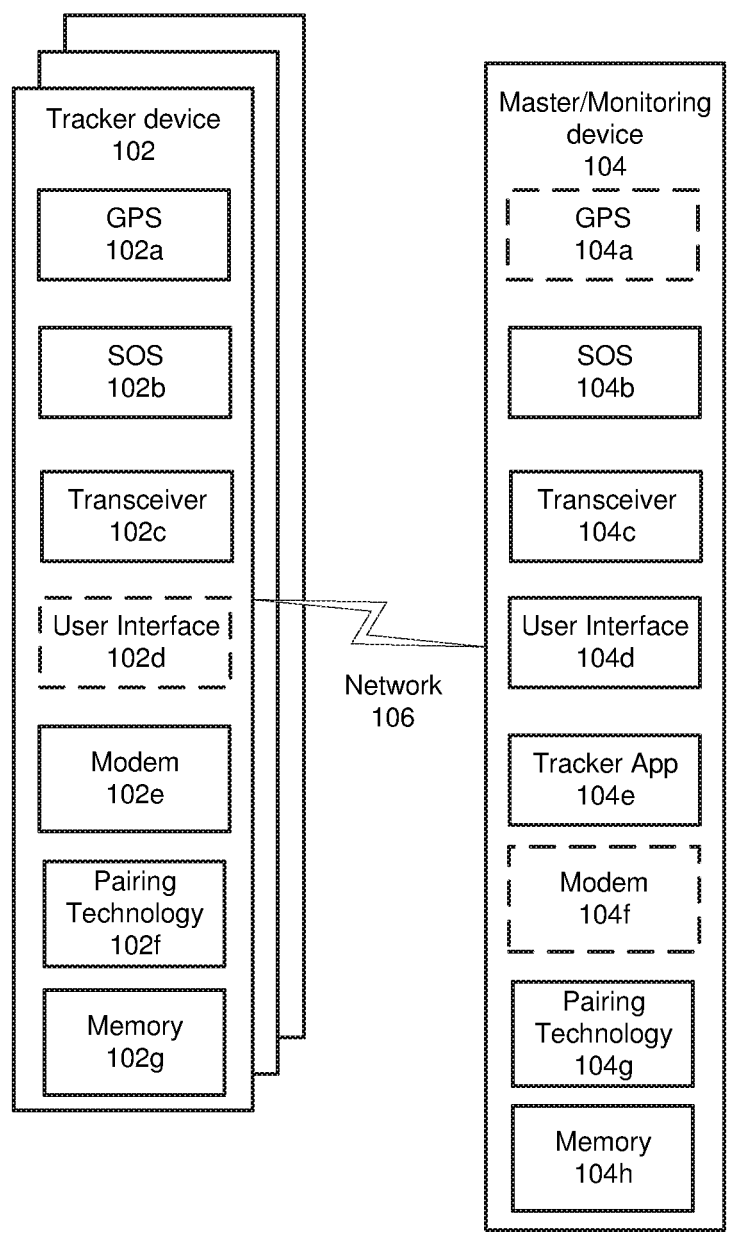
Figure 2:
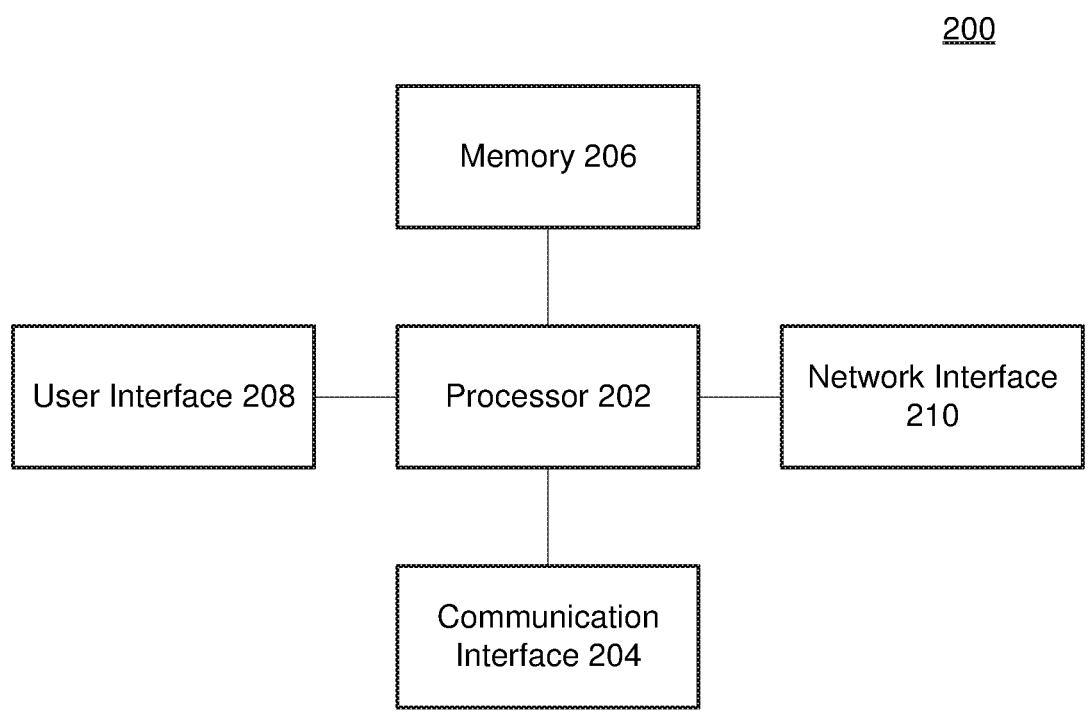
Figure 3:
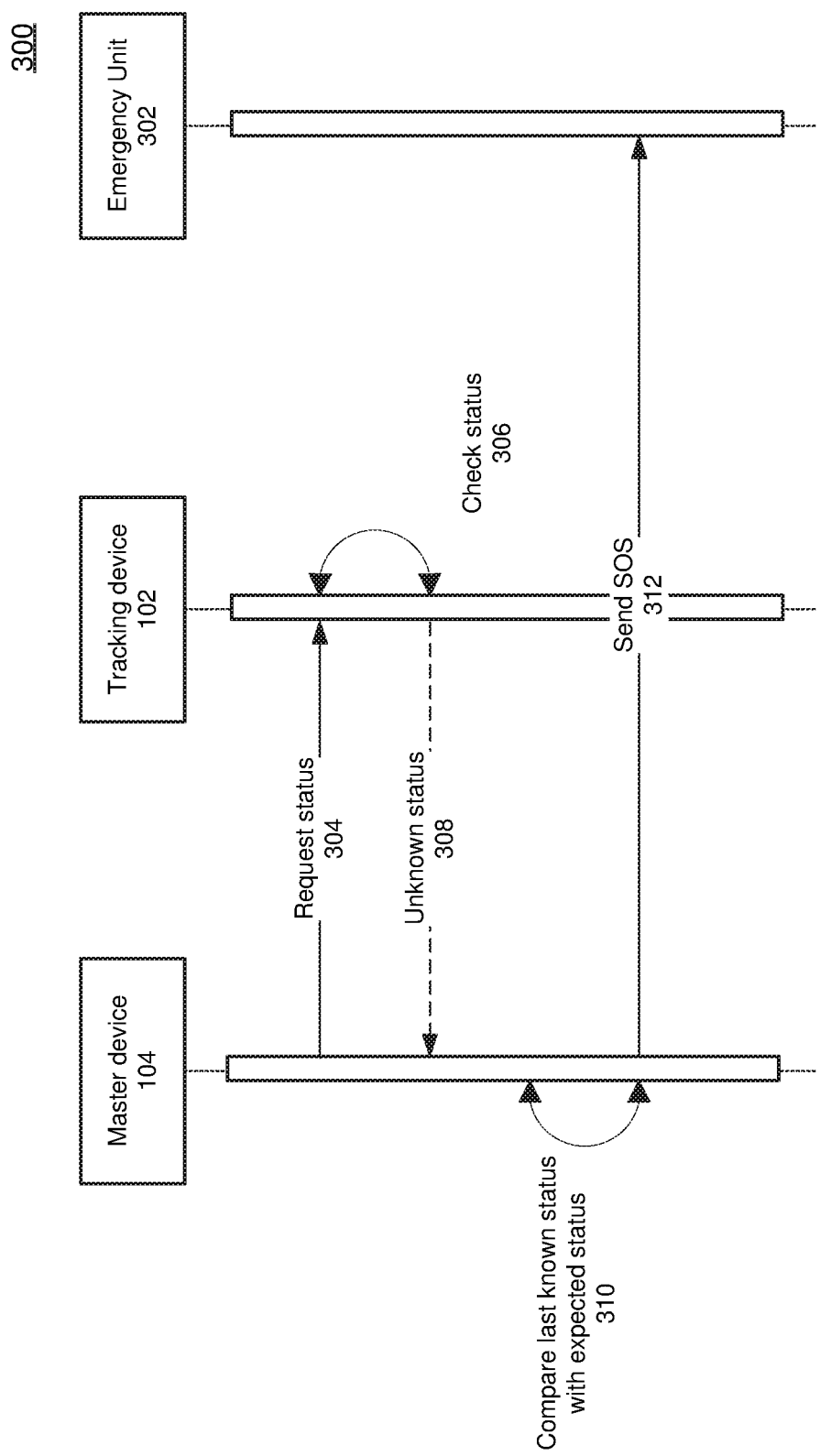
Figure 4:
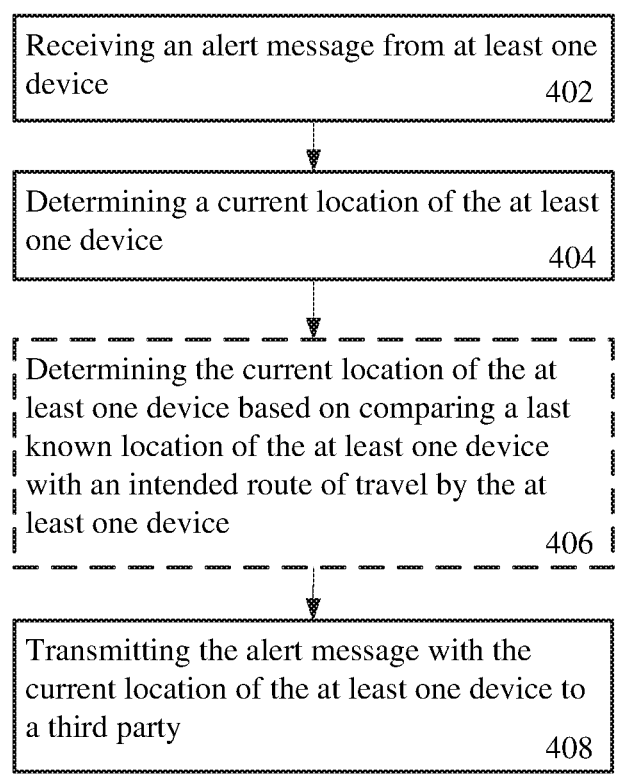
Figure 5:
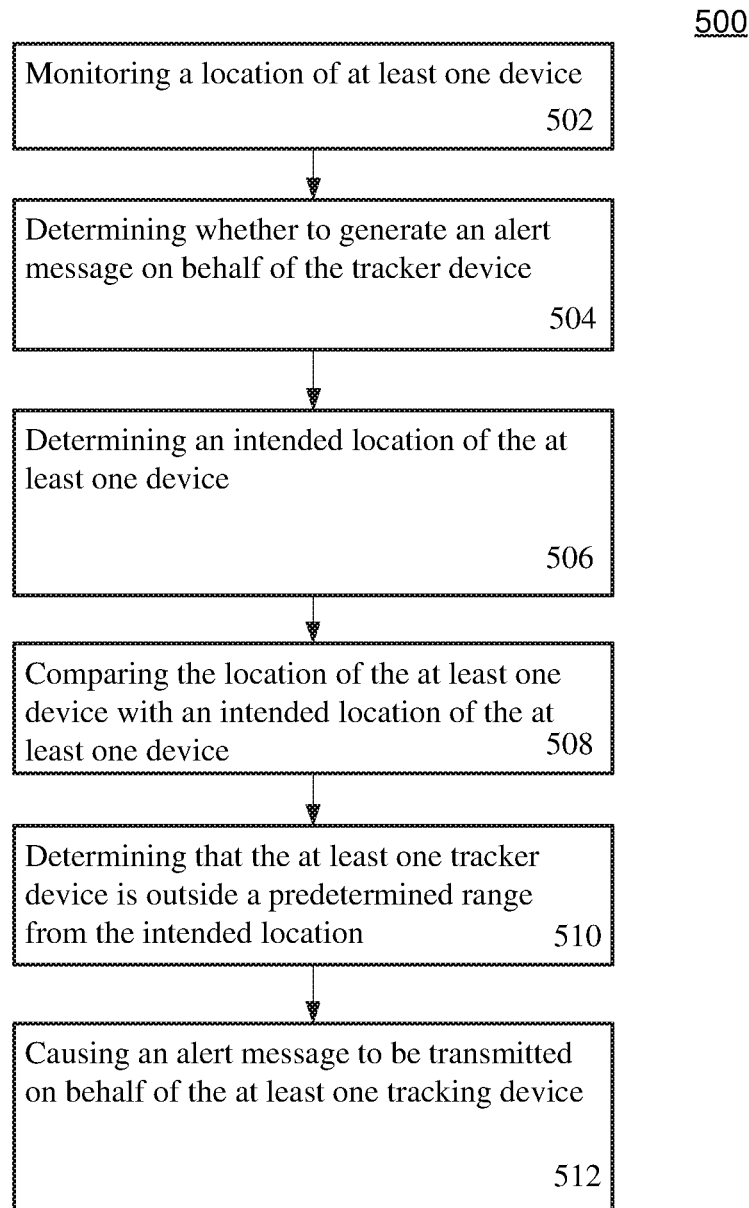
Figure 6:
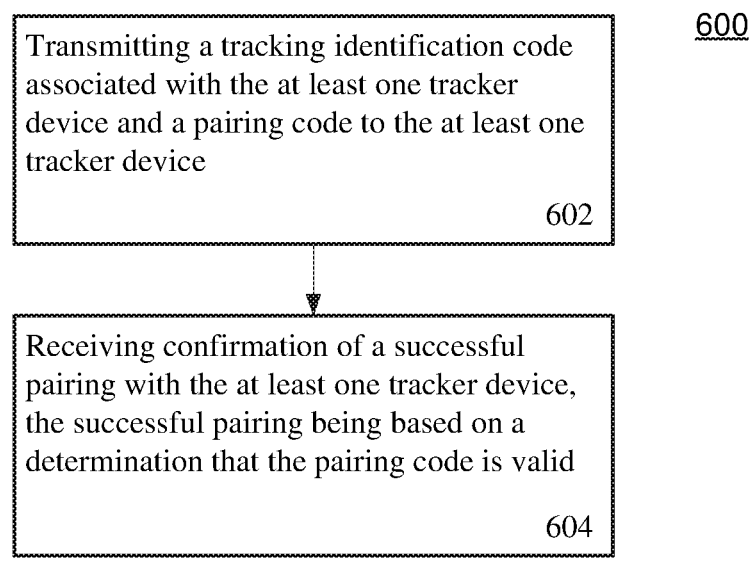
Figure 7A:
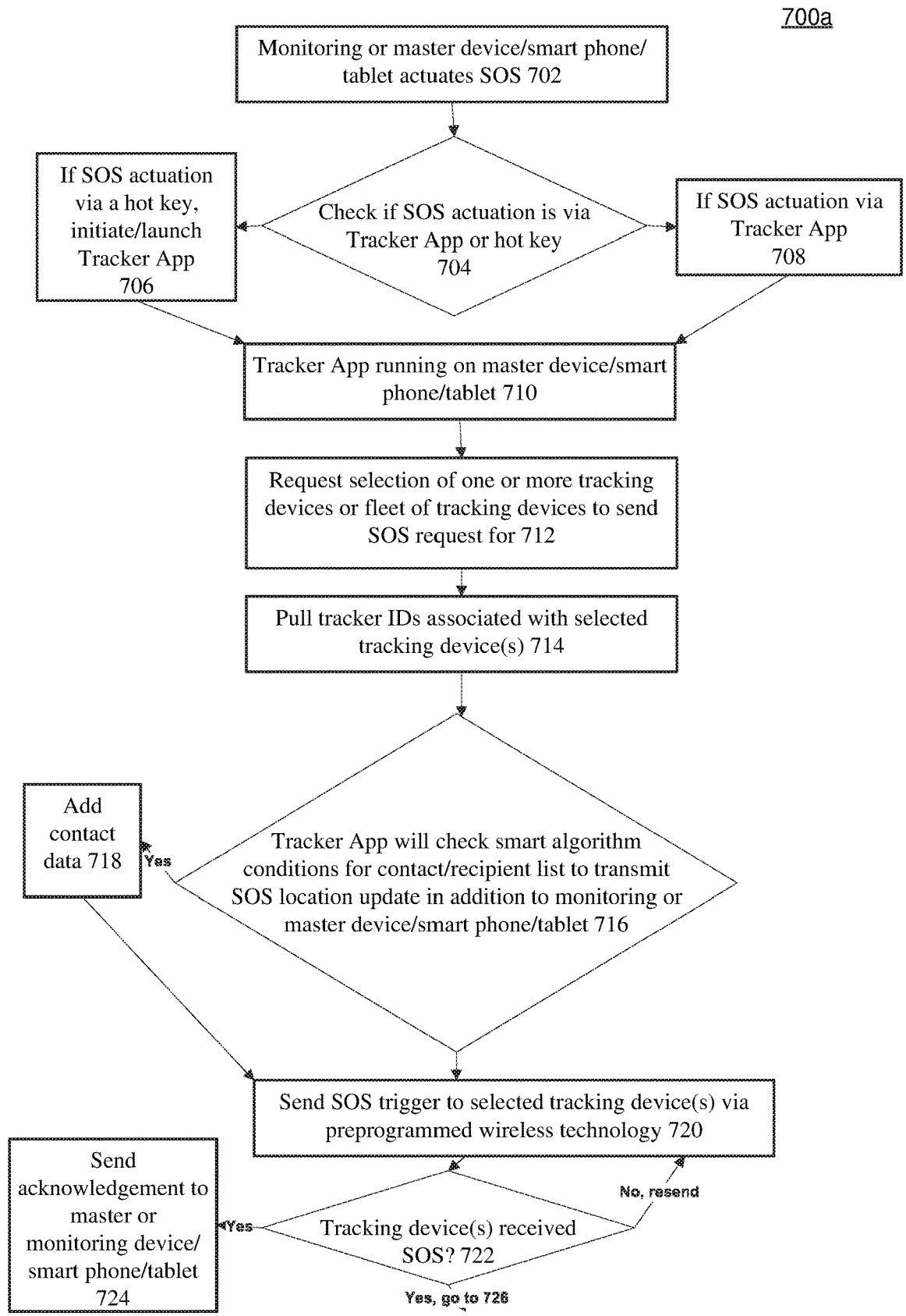
Figure 7B:
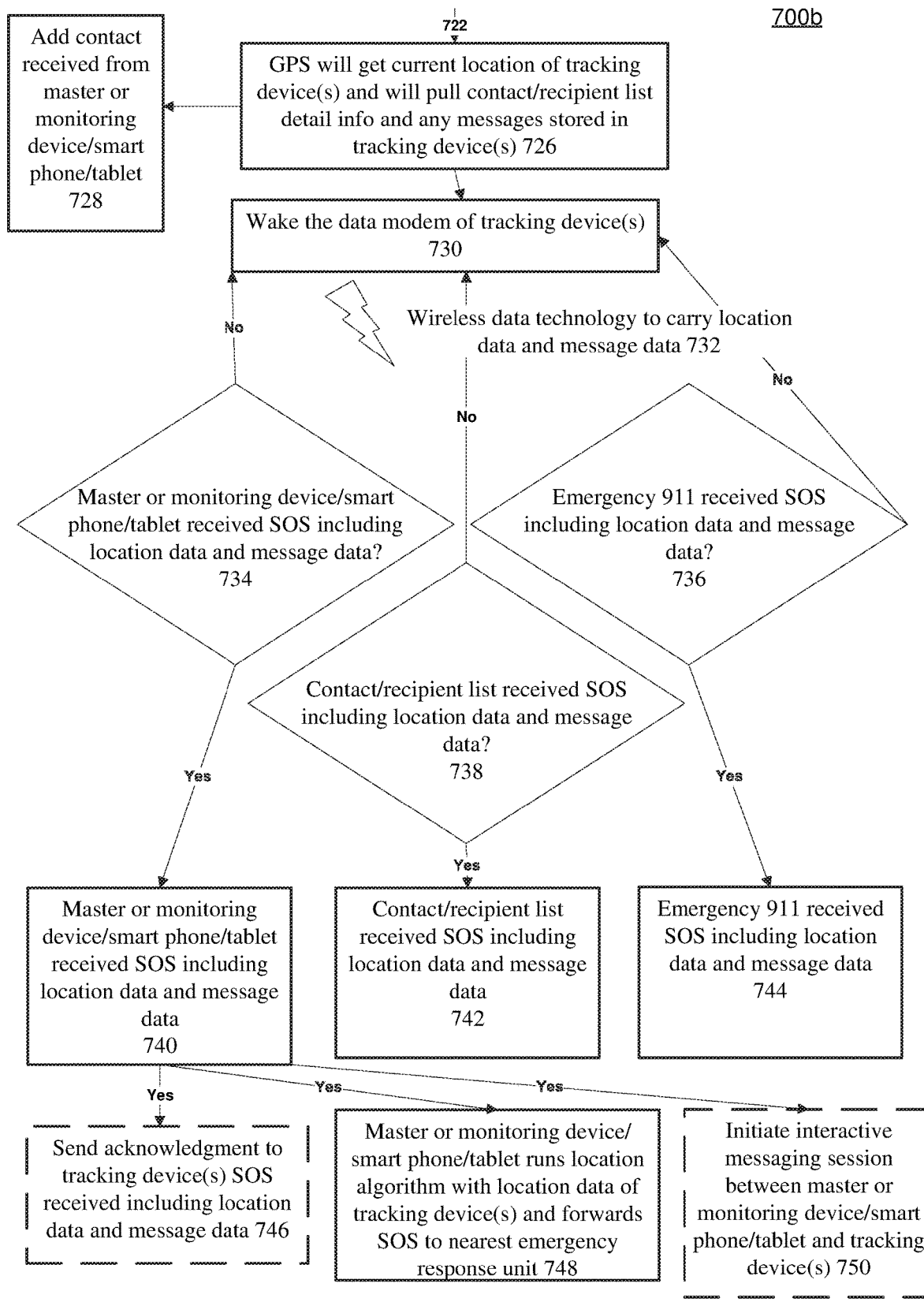
Figure 8A:
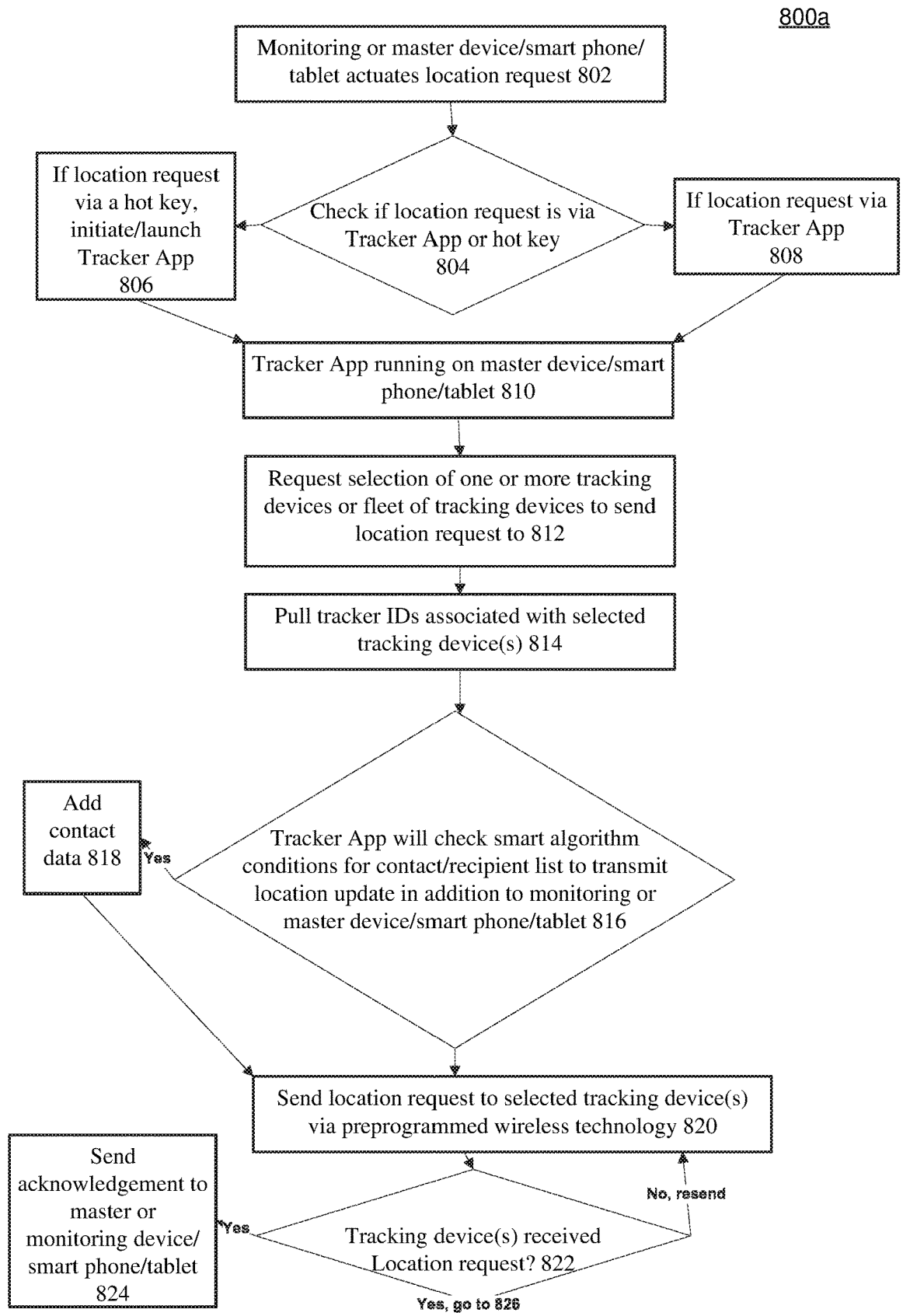
Figure 8B:
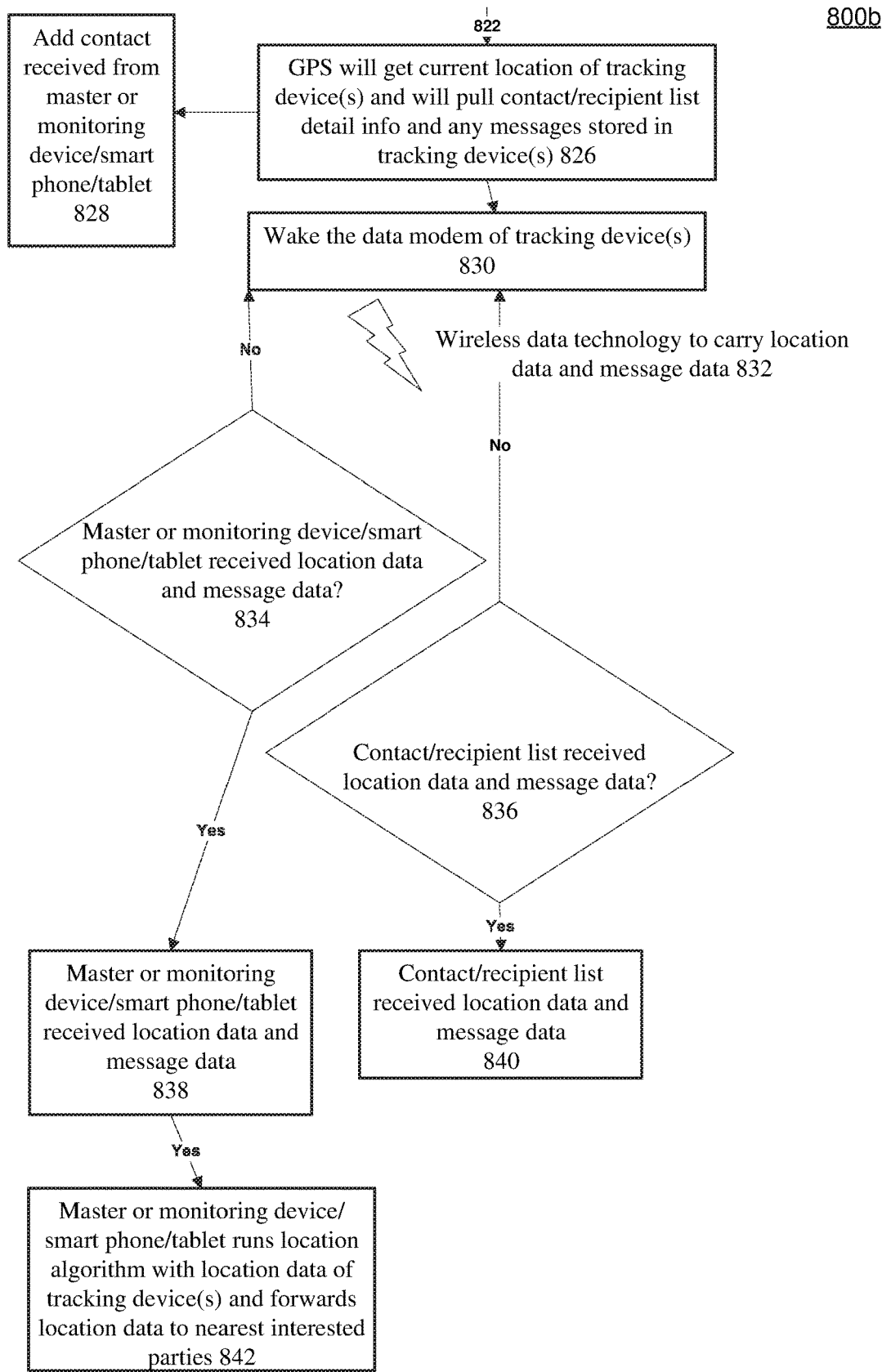
Figure 9:
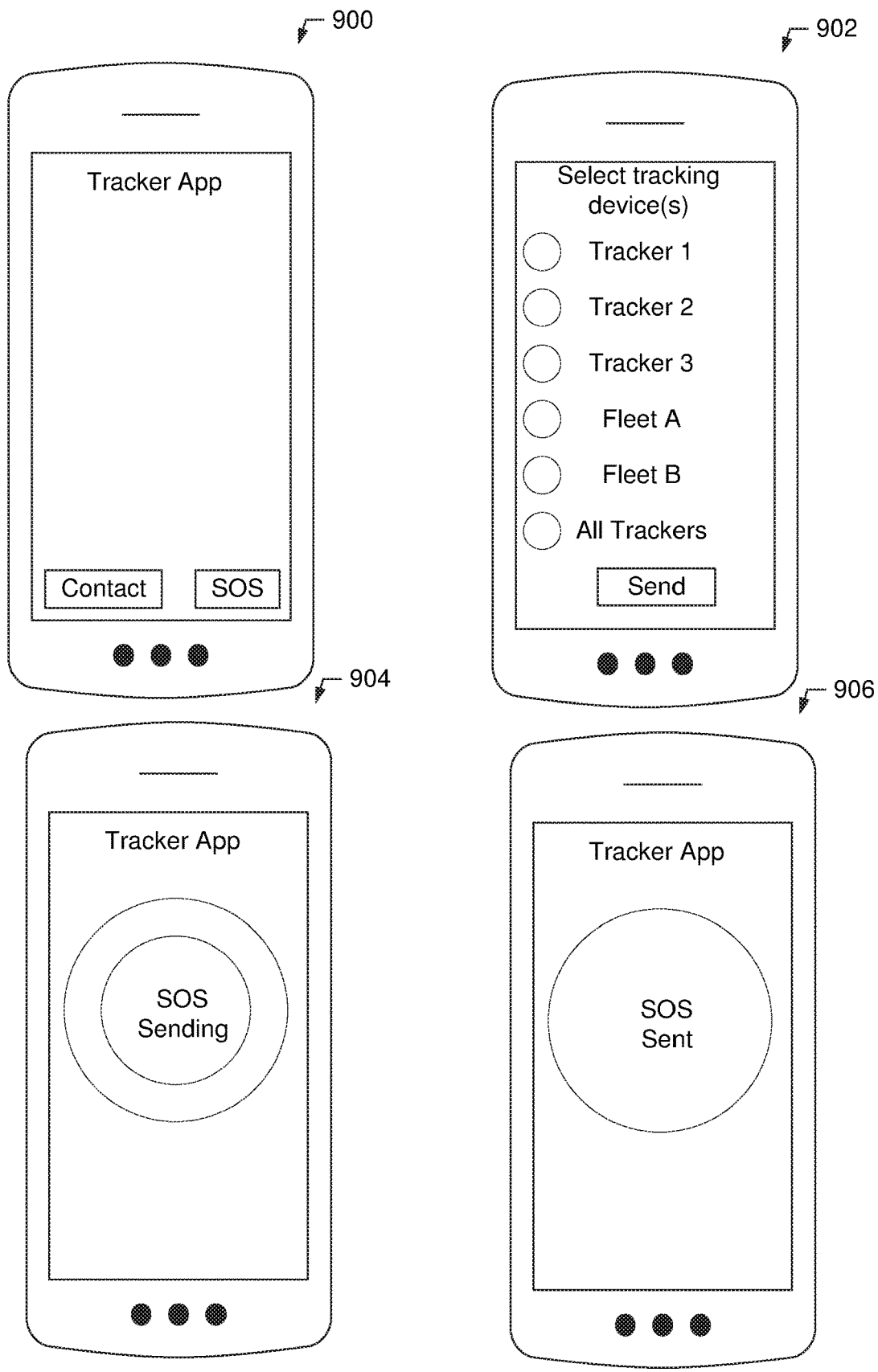
Figure 10:
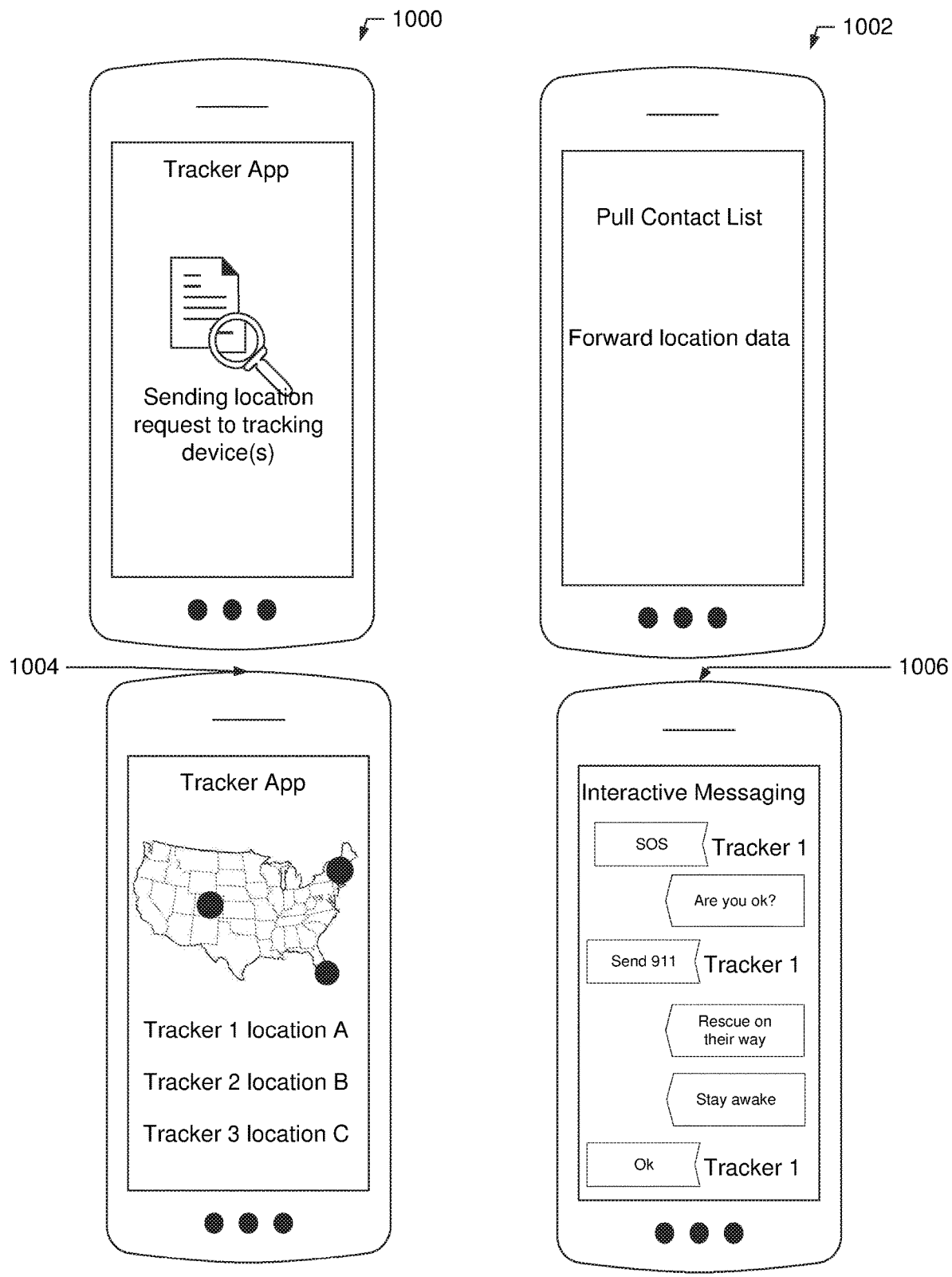

Having thus described certain example embodiments in general terms, reference will hereinafter be made to the accompanying drawings, which are not necessarily drawn to scale, and wherein:

FIG. 1 is an example block diagram of a pair of devices that have device to device communication capability;

FIG. 2 is an example block diagram of a device that may be specifically configured in accordance with an example embodiment;

FIG. 3 is a sequence diagram illustrating operations performed in accordance with an example embodiment of the present invention;

FIG. 4 is a flowchart illustrating operations performed to transmit an alert message;

FIG. 5 is a flowchart illustrating operations performed to transmit an alert message;

FIG. 6 is a flowchart illustrating operations performed to pair devices;

FIGS. 7a and 7b are flowcharts illustrating operations performed to initiate an SOS message;

FIGS. 8a and 8b are flowcharts illustrating operations performed to initiate request for location information of the tracking device; and FIGS. 9 and 10 are schematic representations of user interfaces which may be displayed in accordance with example embodiments of the present invention.

DETAILED DESCRIPTION

Example embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. The terms "master device," "monitoring device," "action initiated device," and similar terms may be used interchangeably. The terms "tracking device," "tracker," and similar terms may be used interchangeably. The terms "alert," "alarm," "notification," "SOS," "location information," "POI (point of interest)," and similar terms relating to types of alert messaging may be used interchangeably herein. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software, firmware, of the Tracker Application (App) described in detail below for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software, firmware, and/or mobile application. As another example, the term 'circuitry' as used herein also includes, for example, a baseband integrated circuit or applications processor integrated circuit for a mobile phone or a similar integrated circuit in a server, a cellular network device, any satellite technology network, Geo Positioning System (GPS), any wireless network, Bluetooth, Wi-Fi, and other near field or far field wireless technology network (mobile/cellular network, satellite network, etc.), other network device, and/or other computing device.

As defined herein, a "computer-readable storage medium," which refers to a non-transitory physical storage medium (e.g., one or more volatile or non-volatile memory device), can be differentiated from a "computer-readable transmission medium," which refers to an electromagnetic signal. The monitoring/master and tracking devices further comprise wireless technology to pair with one another which will be described further below.

A method, apparatus and computer program product described herein is configured to provide a cost effective and/or reliable emergency location solution for miners, hikers, fishermen, rescuers, and others who journey to remote locations and/or who may not have reliable communication capability via standard personal devices such as smart phone, tablets, and/or the like. A user of a personal tracking device may want to communicate his or her location to a master or monitoring device so that the master or monitoring device can analyze the location. In another embodiment, the master or monitoring device may want to analyze the lone worker equipped with a personal tracking device by initiating a request to receive the personal tracking device's location so as to assess their surroundings or forward the personal tracking device's location information on behalf of the tracking device to a medical emergency response unit or rescue center (e.g., 111/999), police, air ambulance, emergency contacts (e.g., family member, friend, caretaker), or any emergency responder programmed in the monitoring/master and tracking devices.

Additionally or alternatively, the emergency responders' information may be inputted via a user interface of such devices so as to provide assistance to the user. The method, apparatus and computer program product are provided in accordance with an example embodiment in order to cause an alert message to be transmitted by a master device or multiple monitoring devices on behalf of one or more tracking devices. In some embodiments, one master device may monitor one to many tracking devices, one to many master devices may monitor one to many tracking devices. In another embodiment, the master or monitoring device(s) may also provide for interactive communication with one or more tracking devices as part of an IOT (Internet of Things) so as to push and pull data.

In general, the examples in the present disclosure describe cost effective systems and methods to monitor and identify a location of a user with a tracking device who is either a lone worker, lost, working in a dangerous, life-threatening environment, has an emergency, has found a point of interest, or the like, by providing a paired connection between at least one tracking device and a master device or a monitoring device that is designed to monitor the at least one tracking device. In another embodiment, the master or monitoring device may need to monitor the location and position (e.g., latitude and longitude) of the one or more tracking devices. The method, apparatus and computer program product implement monitoring and locating the tracking device by way of the master device.

According to one aspect of the subject invention, the method, apparatus and computer program product described herein provides for a secure connection to be created between one or more tracking device(s) and one or more master device(s) or one or more monitoring device(s). This can be accomplished in part by a pairing algorithm which will be described in detail below between one or more master device(s), one or more monitoring device(s) and one or more tracking devices.

In some examples, the pairing of devices may be used to transmit alert messages for help, messages regarding the tracking device's location, and/or the like. In order to send these alert messages and information associated with the location of the user, a master device, paired with a tracking device, may be configured to send these alert messages on behalf of the tracking device.

As a result of the monitoring, tracking, and messaging capabilities, such pairing of devices may be used for a variety of purposes including for example, rescue missions in dangerous environments. For example, if multiple tracking devices are paired with one or many master devices, such as in the case with mining workers coupled to a master monitoring unit or control system, such a system would help in locating and tracking the miners in case of disaster for a speedy rescue operation.

Once paired, the communications from the tracking device to the master device may be limited, so as to advantageously avoid tariffs, such as by limiting communications to a manual request (e.g., activation of an SOS button) and/or upon request by the master device. In such examples, it is the master device that may determine when and/or if a request for information from the tracking device is to be transmitted. Advantageously, by limiting reporting to a situation in which a request is generated a tracking device may not use expensive tariffs and/or may preserve battery life of the tracking device.

In examples where the communications are initiated by the master device, outside a preprogrammed reporting status schedule and waking intervals, the tracking device does not transmit its location unless it receives a request to do so. In some embodiments, when the tracking device is preprogrammed only to respond to a master or monitoring device's request for a status, the tracking device is configured to respond when requested by the master device or monitoring device for a status and/or location information.

In some example embodiments, the tracking device may operate in a sleep mode to reduce power and satellite airtime consumption. During the sleep mode, the tracking device operates at low power and does not report its status and/or transmit its location unless a request is received to do so from a master device. For example, the tracking device in sleep mode may be preprogrammed to wake once a day. Once it wakes, the tracking device is configured to determine whether it has received a reporting request and, if it has received a reporting request, the tracking device is configured to send its status and/or location to the master device. In this case, if a monitoring device requests for location information from a tracking device, the tracking device will wake and/or otherwise activate so as to transmit a response to the request to the monitoring device.

In some examples, the reporting request may be on-demand, based on a periodic reporting or other predetermined reporting interval, and/or generated based on an algorithm. Indeed, in some examples, the reporting interval may be increased/decreased based on a particular location or anticipated event (e.g., last transmission indicated the tracking device was near a dangerous boundary, the tracking device was last located in a dangerous area of a mine, or there is expected contact with a dangerous party). In instances in which the location of the tracking device is determined to be outside of the expected area (e.g., off of a trail), has not moved (e.g., hiker has not moved in 30 minutes), appears to be in a dangerous area (e.g., hiker has crossed a boundary) and/or the like, the master device may automatically and/or semi automatically generate an SOS message for the proper authorities. In other examples, a tracking device is programmed to report its location twice a day (e.g., 6 am and 6 pm). In this case, the master device can request for location when it needs to do additional checks of the location of the tracking device or if the master device is aware of a heightened threat to safety of the tracking device. This may be the case during for example, many military operations or fishing expeditions across sovereign jurisdictions.

Alternatively or additionally, the tracking device may be paired with a nearby or co-located master device. For example, in a situation where a master device, such as a mobile phone or tablet, is not permitted in a particular environment, the tracking device, could be hidden or otherwise placed on a user, and may be configured to communicate with the nearby master device.

In another example, the master device may act as a hub and each of the paired tracking devices are spokes such as in a wireless mesh communications network so that the master device can regulate reporting rate, reporting intervals, and/or the like associated with a plurality of tracking devices. In such a wireless mesh communications network, overlapping radio ranges of tracking devices and a master device according to an embodiment of the present invention may be formed. When the spokes or nodes of the wireless mesh communications network are not within radio range of the hub/master device or in direct radio communication with one another, data may be exchanged between them through intermediate nodes/tracking devices in the wireless mesh communications network. The wireless mesh communications network remains functional even as nodes appear and disappear due to such factors as radio interference, tracking device damage, powering of tracking devices, and/or the like. In this wireless mesh communications network, any node is capable of behaving as if it is the "master" by autonomously reporting an alert event directly to all other nodes and/or reporting the alert event to an emergency response unit. The wireless mesh communications network of tracking devices, therefore, can spread the alert event to the entirety of the area covered by the wireless mesh communications network of tracking devices. A wireless mesh communications network is advantageous, in some examples, in the case where one tracking device can no longer operate, the rest of the plurality of tracking devices can still communicate with each other, directly or through one or more intermediate tracking devices. The wireless mesh communications network is also advantageous, in some examples, when tracking devices are located at scattered points such as in the case with the volcanic mining workers use case.

In some examples, the method, apparatus and computer program product described herein relates to a personal tracking device that can be operated in a variety of modes. In one example operation, where accurate information about the geographical location of a hiker equipped with the tracking device is needed, in order to promptly dispatch emergency service units or other assistance to the correct destination. In some examples, information gathered and inferred from the tracking device may be used to provide valuable information to search and rescue operations when a hiker goes missing. Such information may include where dangerous mountain drop-offs occur. For example, the hiker may record and emit messaging signals that the hiker is passing a boundary close to the dangerous drop-offs. Knowing this information, the master device may then be configured to focus on and may periodically query the tracking device when the tracking device is in range of the boundary (e.g., increase the periodic tracking interval from every 15 minutes to every 5 minutes). For example, if there is no actions or determined activity made by the tracking device after a predetermined time, the master device may determine that there is a high chance that a rescue is needed and may send an alert message on behalf of the tracking device to an emergency rescue team. In some examples, the master device may further be configured to update a reporting status schedule in which the tracking device reports its status. As in the example above, the master device may request from the tracking device a more frequent reporting status schedule in the instance it is determined that the hiker is passing a boundary close to dangerous areas.

In some examples, the wireless communication may be a near distance communication (e.g., Bluetooth, wireless (Wi-Fi) technology, near-field communication (NFC), or Wireless) or afar distance communication (e.g., Satellite, Cellular, any further wireless networks, or the like). For example, far distance Satellite based communication systems provide world-wide communications service and offer great mobility, but at a high cost since a subscriber may place and receive messages or calls from anywhere in the world and may generally move without restriction from one satellite radio communications coverage zone to another. In some embodiments, the tracking device may mitigate the cost of coverage by only communicating during low activity periods such as during lower satellite utilization. In some cases, incentives may be provided to satellite subscribers to increase communication activity during these low activity periods and more effectively utilize the communication channels assigned to satellites. For example, the tracking device may be configured to send a signal to the master device during low activity periods and when a signal is not received by the master device during the predefined period, the master device may be configured to initiate an alert message on behalf of the tracking device.

Typically, in cellular communications systems, the on-peak/off-peak periods generally follow a predictable pattern since cellular systems have cell sites at fixed, spaced apart locations. Thus, a preferred communications period and a discounted rate can be established for that particular geographical location. This predictable pattern may be provided to the tracking device and/or master device in order to take advantage of communications during the discounted rate.

Satellite has more coverage compared to cellular but satellite is expensive. In some cases satellite may be preferred because of its reliability. Satellite airtime may be very expensive and if a tracking device is operating under satellite technology, then a frequent reporting rate will provide a high expense. As such, it is beneficial to request location information of the tracking device from the master device. As disclosed herein, the tracking device is configured with a GPS modem in order to provide its location information and data modem of cellular, satellite, or wireless technology to transmit data to the master or monitoring device(s).

At short distances, the tracking device and master device may pair using Bluetooth technology, wireless (Wi-Fi) technology, near-field communication (NFC) and/or other short range communications. In one example, a user may extend the tracking device application across the two devices. The user may start monitoring the tracking device on the master device, for example on his or her mobile telephone. The user may then either wirelessly pair the device using short range wireless technology such as Bluetooth, using a mobile tracker application (app) or software application on the monitoring device. Alternatively or additionally, the user may physically attach the tracking device to the mobile telephone via a special casing for the mobile phone. For example, the user may want to track himself or herself with the tracker application on the mobile telephone using the mobile tracker app connected to the tracking device via a wireless or wired connection. As such, the tracker app provides for interaction and communication between one or more tracking devices and the master or monitoring device. This operation may be provided by wirelessly pairing or optionally, by physically attaching, the tracking device to the mobile telephone. Thereafter, the mobile phone running the tracker application paired to the tracking device may act as the master device, receiving real time location activity of itself (the tracking device) and/or other tracking devices in proximity and may further send messages to third parties on behalf of the other tracking devices. In some embodiments, once paired, the mobile application by way of the master device may map libraries (in real time or substantially real time) which will pull all other tracking devices and their locations to monitor in a map and provide for sending and/or requesting status/location information on demand or through a reporting status schedule set for the tracking devices.

In a further embodiment, for example, during fishing expeditions, a tracking device may be attached to a boat. To collect location data via GPS, either a satellite or cellular transmitter is used to relay tracking information to the master device, or a GPS receiver is collected from the tracking device instantly when the master devices requests this information or may be sent by the tracking device using its normal reporting period via the reporting status schedule. Additionally, the navigation route of the boat may be monitored. In the case where the boat has reached its intended destination, certain embodiments of the tracking device may provide for a point of interest actuator which is actuated by the user by pushing a physical button or via a user interface display in which the tracking device sends its position information to the master device. As such, location information may be requested by the master or monitoring device without the knowledge of the user of the tracking device if the master or monitoring device needs to do any random checks for the safety of the tracking device or for extra security purposes.

In yet another example, if a storm came on suddenly to which the master or monitoring device may pull location of the tracking device and actuate an SOS based on the location of the tracking device with or without knowledge of tracking device. Another use case may be when the tracking device has capability to store data related to goods acquired such as the amount of fish caught to which the master or monitoring device can pull this data when instantly. Additionally, the tracking device, by default, is configured to report this data based on the preprogrammed reporting status schedule in which the tracking device is set to wake, collect and transmit data to the master or monitoring device based on the scheduled wake up intervals as determined by the reporting status schedule. At any point, the monitoring or master device may change the reporting status schedule.

In some embodiments, boundaries may be determined by geofences that are preloaded in the tracking device or pushed by smart devices. These boundaries may be used to trigger a change in position information. For example, once a tracking device passes or comes close to a boundary, the tracking device may be configured to change its reporting status schedule. For example, when the tracking device is in 250 Km radius of a predetermined boundary or location, the tracking device configured by default to wake every 30 min and report every 1 hour will now be configured to change its reporting status schedule to a more frequent reporting rate such as 2 times an hour and collect position data (e.g. latitude/longitude) If the master device or monitoring device needs position data sooner, the master device may be configured to send a location request or point of interest request to which the tracking device will wake, gather GPS latitude and longitude information, and transmit this information to the master or monitoring device.

In another non-limiting example involving mining, the tracking device may be coupled to a gas meter, or other monitoring device such that data that is monitored and collected may be communicated by the tracking device to the master device and/or other tracking devices within range of the tracking device in a wireless mesh communication network. The tracking device may determine based on the gas meter that toxic gas levels in the area are high and thereafter may send an alert message to the master device.

In yet another embodiment, the master or monitoring device may send a location request or SOS on behalf of the tracking device. The master device may additionally send the alert message with the location of the tracking device to an emergency response unit or may trigger the tracking device to directly send the location to the master, monitoring, emergency unit, relatives, friends, or the like. The master or monitoring device may also be configured to update to this list of individuals/services to contact.

In some example embodiments, location information is sent to contacts preprogrammed or chosen from a list of contacts during SOS alerting based on the configuration of the tracking device and/or master device or monitoring device. For example, if the monitoring or master device is configured with a 1-click send to emergency contact, the master device or monitoring device will be configured to send the SOS alert to the identified parties in the list via the 1-click action event. Additionally or alternatively, the tracker app can have a smart algorithm that refers to data such as position information to which a check is made via the smart algorithm to gather data from internet/connected platforms and locate the nearest emergency response units based on the gathered position information so that the SOS alert is sent to the emergency response unit closest to the tracking device in distress. This information may automatically be forwarded to the tracking device so that its contact list may be updated. In another use case, the one or more tracking devices can be grouped based on the task or operation being performed so that all emergency contacts from the one or more devices grouped together may be contacted. As such, the monitoring device may add, automatically or manually, any emergency contract to communicate an SOS alert message to in case of emergency. In another embodiment, the tracking device is preprogrammed with a predetermined emergency contact list.

In a further embodiment, for example, during fishing expeditions, a tracking device may be attached to a boat. To collect location data, either a satellite transmitter is used to relay tracking information to the master device, or a GPS receiver is collected from the tracking device. The navigation route of the boat may be monitored. In the case where the boat has reached its intended destination, certain embodiments of the tracking device may provide for a point of interest actuator which is actuated by the user by pushing a button in which the tracking device sends its position information to the master device.

In another non-limiting example use case involving mining, the tracking device may be coupled to a gas meter, or other monitoring device, such that data that is monitored and collected may be communicated by the tracking device to the master device and/or other tracking devices within range of the tracking device in a wireless mesh communication network. The tracking device may determine based on the gas meter that toxic gas levels are in the area are high and thereafter may send an alert message to the master device. The master device may then send an alert message with the location of the tracking device to an emergency response unit.

In yet another exemplary embodiment, the transmission of an alert message to various devices is described. This may be applicable to a plurality of tracking devices operating together such as team of armed forces, a group of forest workers, a rescue team, or the like. For example, where a first tracking device is no longer able to communicate with any of the other tracking devices over a wireless mesh communication network for some reason, a second tracking device in the wireless mesh communication network device may determine that communication for the first tracking device may be unavailable. In response, the second tracking device may send an alert message over the wireless mesh communication network. The alarm message includes location information of the first tracking device. The alert message is then propagated from the second tracking device through the wireless mesh communication network to other tracking devices. Each tracking device receives the alert message, the message is repeated, in some examples, so as to reach the master device in which the master device may send the alert message along with the location of the first tracking device to a rescue team so as to provide timely assistance.

Alternatively or additionally, the tracking device may not need to be physically attached to the master device/mobile telephone and may be paired through Bluetooth technology, Wi-Fi, and/or another short-range wireless technology. In the instance the two devices are not within Bluetooth or Wi-Fi range, the pairing may be accomplished using long-range wireless communication technologies such as cellular technologies, satellite technologies, and/or other long-range technologies available.

One example of the monitoring and tracking system 100 includes a plurality of tracking devices 102 and at least one master device 104 is depicted in FIG. 1. In some examples, the tracking device 102 is associated with a user or a group of users that are traveling or operating together. The tracking device 102 may be used for locating, tracking, and recovering persons who may be in distress or who may have found a point of interest. The tracking device 102 may take any form factor and in some examples, may be small enough to be hidden in a shoe. In other examples, the tracking device 102 may take other forms such as a watch, clip on device, a bracelet, lanyard, and/or the like. Although the tracking device can take any form, it is preferred the tracking device be easily handheld and hidden if need be.

Separate tracking device models having the same or substantially the same functionality and are each configured to be compatible with the master device 104. A first version of a tracking device may include a Global Positioning System (GPS) 102a module and a SOS 102b module. A second version of the tracking device includes the Global Positioning System (GPS) 102a module, the SOS 102b module, and further may include a physical keyboard. The added physical keyboard in the second version of the tracking device provides for the ability to send text or other communications from the tracking device. The third version of the tracking device is configured to pair to any mobile device, such as a smartphone, tablet, or the like and operate via mobile application or software application. The pairing could be physical if the same person is carrying the tracking device and mobile device is in a physical connectable distance. In some embodiments, pairing forms a wireless connection. In some examples, the tracking device and mobile phone/master device or monitoring device may be placed together or in a case where the monitoring or master device may be operated via long or short distance using cellular, satellite pairing or for short range wireless technology such as Bluetooth, Wi-Fi, NFC, or the like. The third version provides for operating the tracking device via the mobile device to which the tracking device is connected to. A fourth version may include one or more of the above-mentioned features/functions. Other versions may also be included that have functionality similar to a mobile phone, a computer, a wearable, a watch, and/or the like.

As shown in FIG. 1, the tracking device 102 may include any suitable combination of hardware circuitry and software for implementing several functions. These may include a Global Positioning System (GPS) module 102a. The GPS module 102a comprises a GPS receiver that can compute the current geographic location of the tracking device 102. Furthermore, the GPS module 102a having the current geographic location of the tracking device 102 may collect positioning information such as latitude and longitude coordinates of the tracking device 102. Optionally, the tracking device 102 may be equipped with an optional user interface 102d having a display that may present the location and positioning information of the tracking device 102. In some embodiments, the GPS module 102a may be programmed as a default to report when the tracking device is outside a boundary based on a predetermined intended route of travel by the tracking device. As such, SOS can be initiated via the tracking device or via the paired mobile phone, master device, or monitoring device configured to initiate the SOS on behalf of the tracking device. Optionally, the SOS may initiate an LED light or alert when the tracking device has such features. In another embodiment, the paired mobile phone, master device, or monitoring device may initiate and send the SOS via wireless pairing technology so that the tracking device upon receiving the SOS, will get location and position information and transmit the location and position information via data communication circuitry, such as technology modem 102e. The tracking device 102 may be configured to use other location technologies such as Global Navigation Satellite System (GNSS), cellular triangulation, or the like.

The SOS module 102b comprises, in some examples, a SOS actuator button. In some examples, when the SOS actuator button is actuated, the SOS module 102b is configured to cause the tracking device to communicate an SOS alert message over a satellite network or any wireless communication network. Although described herein, as a SOS alert message, various types of messaging may be utilized in other embodiments. For example, a point of interest (POI) message may be used in the case where the tracking device 102 has reached its intended destination. The SOS alert message indicates that the user equipped with the tracking device is in danger and requires rescue. Additionally or alternatively, the SOS module 102b may be automatically generated under various circumstances. For example, the SOS alert message may be automatically generated and transmitted if the user of the tracking device stops moving for a minimum amount of time. The amount of time may depend upon the environment, the user, the risk associated with the activity the user is engaged in, and/or the like. In the case of the volcanic miners, it may be rare for a miner to stop moving for, e.g., 5 seconds while inside an active volcano. Another instance where the alert message may be automatically transmitted is in response to a sudden or unexpected acceleration, which may occur from a collision or collapse.

Additionally or alternatively, in the wireless mesh communication network, each tracking device of the plurality of tracking devices in the mesh network may be configured to transmit the alert message to the master device 104 as well as information related to the geographic location of the tracking device as discussed herein. For example, the SOS actuator button may be self-activated in the instance it has been determined by a peer tracking device that the tracking device has lost connection. In some examples, a period of time is monitored for activity, but if no activity is determined in the period of time, the peer tracking device may generate and/or trigger an alert message so as to propagate the alert message to other tracking devices in range within the mesh network and to the master device 104. In some example embodiments, SOS initiation is provided for via a hard button, reprogrammable button that links to the tracker app running on the master or monitoring device or via an app icon or selection key, touch icon on the app or voice command programmed to the app.

The tracking device 102 may also include a transceiver 102c to support any communication technology such as cellular, satellite, Bluetooth, Wi-Fi, Near Field Communication (NFC), as well as other wireless communication protocols. In some examples, the tracking device may be tethered or otherwise linked via a wired connection to the master device 104. The transceiver 102c may respond to queries from the master device 104 via a wireless communication network at periodic intervals to provide the master device 104 with an indication of its activity status.

Optionally, the tracking device 102 may include a user interface module 102d which may display messages on a display screen, provide an input mechanism such as a keypad including a number of QWERTY keys or any touch screen, or any touch tone numerals for generating outgoing messages. The tracking device 102 may also prompt its user to send its location and/or status to another device. The message may comprise a location of the tracking device and/or status of the user.

The tracking device 102 may also include a data communication technology modem 102e that receives location information from the GPS 102a receiver and transmits the location information to the master device 104 via satellite or cellular technology. In some examples, modem 102e and transceiver 102c may be part of the same chip or otherwise may operate together to transmit and receive messages. Additionally, the modem may include latitude and longitude data. The modem 102e may comprise cellular, satellite and/or a combination of related technologies to transmit location information including SOS/POI data, latitude, longitude data, and any additional related data.

The tracking device 102 may also include a pairing technology module 102g, the pairing technology module 102g may be configured to implement any one or more pairing technologies as per default configuration setting set for the tracking device 102. The tracking device 102 may be configured to follow a list of wireless technologies in order to pair with a master device or monitoring device. For example, the tracking device may first use Bluetooth if available, followed by Wi-Fi, NFC, and then cellular or satellite technology to pair with the master device or monitoring device. There are factors considered when implementing the pairing technology such as whether the network or technology is secure for pairing, whether the tracking device needs reliable service such that satellite may be prioritized above the other technologies. In some example embodiments, the paring technology module 102g comprises the ordered list of wireless technologies to use for pairing and it preprogrammed. The pairing technology module 102g may be configured to change the priority list at any time based on factors such as security, location of the tracking device and/or master device, mission type, or the like. In some embodiments the pairing technology determines the type mode or use of the one or more tracking devices when prioritizing the wireless technologies for pairing. For example, the modes or types may be military use, leisure, fishing, etc. where the order of technology selection could be programmed based on mode or type. In some embodiments, selection may be configured by the user or configured by an algorithm when multiple pairing technologies is possible. In some embodiments, SOS initiation may be done via the paired master device or paired monitoring device or paired smart phone or table, or a combination of any above.

The tracking device 102 may also include memory 102g to store data for later transmission when the tracking device is awake. For example, the tracking device may store data associated with a particular point of interest and may transmit this information based on the next scheduled reporting status update to be sent to the master device 104.

The tracking device 102 is configured to communicate wirelessly with the master device 104 or another tracking device. The wireless communication can be cellular, satellite, Bluetooth, Wi-Fi, Near Field Communication (NFC), as well as other wireless communication protocols. In one example, location information and/or status information of the tracking device 102 can be transmitted or communicated with the tracking device is connected to the master device 104 or another tracking device. In another example, location information related to tracking device 102 may be transmitted to a mobile device with which the tracking device 102 is paired via Bluetooth technology. In this example, the tracking device 102 is placed a certain distance from the mobile device (master device) such that the tracking device may communicate with the mobile device. Additionally or alternatively, the modem 102e may support such communication via cellular, satellite, and similar far distance wireless communication technologies.

The master device 104 may be used for monitoring the tracking device 102 and may be a mobile terminal, such as a mobile telephone, PDA, pager, laptop computer, tablet computer, or any of numerous other hand held or portable communication devices, computation devices, content generation devices, content consumption devices, or combinations thereof. In accordance with some embodiments, the master device 104 may include or be associated with an apparatus 200, such as that shown in FIG. 2 and described below. In certain embodiments, the master device 104 may be associated with a user and/or a central control monitoring system.

Notably the master device 104 is configured to track and record the location/activity of the tracking device 102. A comparison may be made based on the current location of the tracking device 102 or the last known location of the tracking device 102 with an intended route of travel by the tracking device 102. Based on the comparison, the master device 104 may send an alert message to a third party response unit. The alert message may include the current location or predicted location of the tracking device based on the comparison to the intended route of travel by the tracking device 102.

As shown in FIG. 1, the master device may optionally include a GPS module 104a similar to the tracking device 102. The GPS module 104a comprises a GPS receiver that can compute the current geographic location of the master device 102. Like the tracking device 102, the master device 104 includes, in some examples, a SOS module 104b configured to send an alert message on behalf of one or more tracking devices to an emergency response unit. In some embodiments, the monitoring or master device may be configured to utilize the tracker app as described below so as to initiate an SOS instantly on behalf of one or more tracking devices.

The master device 104 further includes a transceiver 104c. The wireless tracking transceiver 104c having a transmission range in which each tracking device 102 must reside within the transmission range of at least one other tracking device or the master device 104. Note that in a wireless mesh communication network, each tracking device and the master device provides a larger physical span than the transmission range of any single device.

In certain embodiments, the master device 104 further includes a user interface 104d comparable to the user interface 102d of the tracking device 102. The user interface 104d may display alert messages, tracking device activity and location information associated with one or more tracking devices. The user interface 104 may also provide for text input through a keypad.

The master device 104 may include a modem 104f comparable to the modem 102e of the tracking device 102, pairing technology module 104g comparable to the pairing technology 102f of the tracking device 102. Furthermore, the master device 102 may include memory 104h to store data related to the tracker app 104e.

Additionally, the master device may include a tracker application 104e that can determine the current location of one or more tracking devices, upon request. In some embodiments, the tracker application 104e may periodically poll the location of the one or more tracking devices by requesting the device to wake and transmit communication signals in response to a request. The tracker application 104e may also include an SOS initiation capability in the tracker application 104e. Additionally or alternatively, when the tracking device 102 is located within a predetermined radius of a point of interest (POI), the tracker application 104e is configured to issue a notification to a user of the master device 104. When the location information of the tracking device 102 is received, the master device 104 may display the location information of the tracking device via the user interface 104d using the tracker app 104e.

In some examples, the tracker application 104e may also have the following functions: alerting function (e.g., SOS, POI); configuration setting to change tracking device or tracking devices wakeup intervals, reporting intervals, emergency contacts, SOS contacts, location maps or the map libraries to access on the device or online, smart algorithms; optional setting for what GPS to use; change reporting status schedule; analysis capabilities; interactive SOS communication with the one or more tracking devices or monitoring devices; ability for text/email messaging; monitor last transmission details of satellite or cellular modem of tracking devices; group tracking devices into one or more fleets; push data into cloud or connect via Internet of Things; utilize sensors; and many more related functions to initiate on behalf of the tracking device 102.

For example, and as described further below, the tracking device may be configured to report its status every hour. However, in the last reporting status, the tracking device is not in a location it is expected to be. For example, when the master device has determined that the tracking device is outside more than 250 km from its expected location, the master device may be configured to send a message to wake the tracking device and request a status every 10 minutes instead of every hour. If, based on the new reporting status, the tracking device is off track, this deviation will initiate an SOS to be sent by the master device 104 on behalf of the tracking device 102. The master device 104 is configured to receive the latitude and longitude of the tracking device 102. Additionally, the master device 104 may be configured to send the SOS message to a predetermined one or more emergency contacts such as the police, emergency rescue center, family members, and/or the like. The master device 104 may be further configured to contact the nearest emergency response unit based on the exact latitude and longitude of the tracking device 102. Optionally, the SOS message may comprise any text further describing the SOS action call.

The master device 104 is configured to continually try to send the SOS message for a predetermined period of time (e.g., 1 hour, 2 hours, 5 minute, etc.). The master device 104 may additionally be configured to display a status of the transmitting message via the user interface 104*d*, the tracker app 104*e*, or the like. The status may be color coded and may further indicate a sending, retrying, or sent status. In the event, the SOS has yet to be sent successfully, the master device 104 is configured to keep trying until the message is eventually sent or cancelled. In the case of poor satellite or cellular network coverage, the SOS message will resend once stronger satellite or cellular coverage is established.

In another embodiment, the master device 104 may be configured to poll/ping the one or more tracking devices continuously, periodically or when required such as when specific information regarding the status of the one or more tracking devices is needed. Polling or pinging a tracking device includes, but is not limited to, requesting the status of the device and/or gathering location information of the tracking device. For example, the master device 104 may be configured to continuously monitor the one or more tracking devices when it has been determined that the one or more tracking devices is exposed to a dangerous environment such as in the example where the hiker is within close boundaries of dangerous mountain drop-off points. In another example, the master device may be configured to periodically ping the tracking device in an instance when the tracking device is on a boating expedition in uncharted territories. That is, the master device 104 may increase periodic requests based on the proximity to a boundary, an area of interest, etc.

In one embodiment, the master device may be configured to ping the tracking device based on a user request or based on a request from another tracking device. For example, in the case of the master device, a user may access the master device to request an update of the location of the tracking device 104. By way of further example, in the case in the wireless mesh communications network, the master device may be configured to receive an alert message from a peer tracking device, the alert message had been forwarded to the peer tracking device from the tracking device. The master device is then configured to request the status or locate the tracking device.

In some embodiments the tracker application 104*e* may be configured to retrieve route-specific characteristics which may include, but are not limited to route distance information, incline/decline route information, route types such as country roads, highways, and/or the like, estimated travel time, etc. Location information of the tracking device 102 may be collected from the master device 104. The location information collected may occur constantly or periodically depending on the environment of the tracking device 102 and may be reconfigured by the master device 104. In another embodiment, the master device 104 may determine whether the collected location information of the tracking device 102 exhibits any significant deviation from the expected/intended route of travel to be taken by the tracking device 102. For example, a threshold may be established in order to allow for some deviation from the intended route of travel without triggering initiation of an alert message. In such an arrangement, the master device 104 does not identify a significant deviation unless the magnitude of the deviation exceeds the specified threshold. Additionally or alternatively, a significant deviation may be, for example, one which exceeds a specified threshold, or one which persists over time. In this context, significant deviation is generally intended to encompass deviations other than those attributable to random fluctuations.

As shown in FIG. 1, tracking device 102 and master device 104 may communicate with one another as a pairing for data transmission and communication via network 106. Network 106 may be a wireless network, such as a Long Term Evolution (LTE) network, an LTE-Advanced (LTE-A) network, a Global Systems for Mobile communications (GSM) network, a Code Division Multiple Access (CDMA) network, e.g., a Wideband CDMA (WCDMA) network, a CDMA2000 network or the like, a General Packet Radio Service (GPRS) network, Wi-Fi, a wireless local area network/Bluetooth (WLAN/BT), satellite network (ISATM2M, ISAT Data Pro (IDP), Inmarsat satellite technology, Iridium satellite, Global star satellite network, Thuraya network, Beacon, or future satellite network), or other type of network. In some embodiments, the tracking device 102 is configured to prioritize the wireless communication networks based on availability and/or cost. Pairing provides for transmitting location information data from the tracking device 102 to the master device 104. Furthermore, pairing provides for transmitting alert messages associated with the tracking device 102 via the master device 104.

According to some aspects illustrated herein, pairing involves the master device 104 transmitting a tracking identification code associated with at least one tracking device and a pairing code to the at least one tracking device. A plurality of tracking devices may receive a respective tracking identification code and a pairing code transmitted by the master device 104. Each tracking identification code uniquely identifies a tracking device. The tracking identification may be preprogrammed into the master device. This may be the case for long distance pairing.

In another embodiment, using Bluetooth or any near distance communication technology, the master device may be configured to discover one or more tracking devices within close distance of the master device or far distance based on pairing technology (Bluetooth, Wi-Fi for far distance via cellular or satellite). Each tracking device will have a unique tracker identification (ID) to be identified by the master or monitoring devices or other tracking devices. The pairing code may be unique pairing code to one tracking device or may be shared by a group/fleet of tracking devices. For example, a group of tracking devices on a shared mission may use one pairing code. As such, one or more tracking devices or a fleet of tracking devices may be paired with the master or monitoring device. In some embodiments the pairing code may be encrypted. The one or more tracking devices is configured to manually accept, have a discover mode that enables acceptance, or may be preprogrammed to accept via a script loaded on the tracking device to accept and confirm pairing with the master device once the one or more received pairing codes is determined to be valid by the one or more tracking devices. It should be appreciated that the invention can be readily applied to other technologies, other than Bluetooth, involving proximity detection and establishing secure wireless connections with a variety of mobile devices; and such are contemplated to fall within the scope of the invention.

The device 200 illustrated in FIG. 2 of an example embodiment may be embodied in various manners, but, in an example embodiment may include one or more processors 202, one or more memory devices 206, a network interface 210, a communication interface 204, and a user interface 208. As used herein, a tracking device 102 or master device 104 take the form of device 200. For example, in an example embodiment, the tracking device 102 may be configured to act as the master device and track itself. This may be implemented by physically attaching the tracking device to the master device or wirelessly pairing the tracking device to the master device.

Contained within memory device 206, in some examples, are the route-specific characteristics of a plurality of routes of travel intended by the tracking device 102 as described in regards to the tracker app 104e in FIG. 1. In some embodiments the route-specific characteristics of a plurality of routes travel intended by the tracking device 102 is tracked, collected, and pushed to the master device or a data center for monitoring via any wireless technology described herein. The memory device 206 may also be used to store data related to transmit stored data to a paired master device when the tracking device 102 wakes up such as in the case when the tracking device 102 is in sleep mode. Indeed, when executed by the processor 202, tracker app 104e stored in memory devices 206, is configured to perform at least some of the steps of at least FIGS. 3-8b.

In some embodiments, the processor 202 (and/or co-processors or any other processing circuitry assisting or otherwise associated with the processor) may be in communication with the memory device 206 via a bus for passing information among components of the apparatus 200. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As described above, the apparatus 200 may be embodied by a master device 104 or the tracking device 102. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 206 or otherwise accessible to the processor 202. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a tracking device 102 or master device 104) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 200 also includes both a network interface 210 and a communication interface 204. As used herein, the transceiver 102c and the transceiver 104c take the form of or be embodied as the communication interface 204. The network interface may be any means such as a device or circuitry embodied in either hardware or a combination of hardware and software that is configured to transmit data to a remote network device, such as a cloud server or a set of servers, such as via a cellular network. The communication interface 204 may be any means such as a device or circuitry embodied in either hardware or a combination of hardware and software that is configured to receive and/or transmit data from/to other patient measurement units that are located in proximity to the apparatus, such as via any of the various proximity based communication techniques, such as in accordance with Bluetooth™ LE, Bluetooth™ IEEE 802.15.4 or Wi-Fi protocols. The network interface 210 and the communication interface 204 may each include, for example, an antenna (or multiple antennas) and supporting hardware and/or software for enabling communications with a wireless communication network. Additionally or alternatively, the remote network interface and the local communication interface may each include the circuitry for interacting with the antenna(s) to cause transmission of signals via the antenna(s) or to handle receipt of signals received via the antenna(s).

The apparatus 200 may also include a user interface 208 that may, in turn, be in communication with the processor 202 to receive an indication of a user input and/or to cause provision of an audible, visual, mechanical or other output to the user. The user being a user of the tracking device 102 and/or master device 104. As such, the user interface 208 may include, for example, a keyboard, a mouse, a joystick, a display, a touch screen(s), touch areas, soft keys, a microphone, a speaker, or other input/output mechanisms. Alternatively or additionally, the processor 202 may comprise user interface circuitry configured to control at least some functions of one or more user interface elements such as, for example, a speaker, ringer, microphone, display, and/or the like. The processor 202 and/or user interface circuitry comprising the processor 202 may be configured to control one or more functions of one or more user interface elements through computer program instructions (e.g., software and/or firmware) stored on a memory accessible to the processor 202 (e.g., memory 206, and/or the like). As used herein, the user interface 102d and the user interface 104d may take the form of the user interface 208.

Referring now to FIG. 3, the operations performed, such as by the tracking device 102, the master device 104, and the emergency unit 302 are performed in order to provide emergency assistance to a user of tracking device 102. Although described herein, as an emergency unit, various types of third parties may be utilized in other embodiments. In one embodiment, the master device 104 is configured to detect the presence of a plurality of tracking devices. The master device 104 is then configured to transmit a broadcasting packet, the transmitted broadcasting packet is used to announce interest in pairing with one or more tracking devices. In certain embodiments, one or more tracking devices may receive the broadcasting packets in which the one or more tracking devices, may in response, send a reply confirming the desire to pair devices. The following operational steps come after the two devices are paired. As shown in 304, a request for the status of the tracking device 102 is sent to the tracking device 102 from the master device 104. For example, in the volcanic mining expedition, a manager equipped with the master device 104 may want a status of a miner with the tracking device 102.

Upon request for status from the master device 104 (304), the tracking device 102 checks it's status 306. For example, the tracking device 102 may prompt the tracking device to send a message or the tracking device may check if the SOS module 102b has been triggered or if input on the user interface 102d needs to be sent to the master device 104 in response to the status request.

In the instance an unknown status 308 is explicitly received or determined from the master device 104, the master device 104 may compare the last known status with an expected status of the tracking device 102 at the time of the status request. For example, it may be expected that the status of tracking device 102 at the time of the request comprises a location northeast of the volcano; however, it is determined by the master device 104 that the current location of the tracking device is actually southeast of the volcano. The southeast location being a dangerous zone with high levels of sulfuric gas. As such, the master device 104 may send an SOS message 312 on behalf of the tracking device 102 to the emergency unit 302 in order to rescue the user of the tracking device 102.

The aforementioned sequence of operations provide automatic means to configure the master device 104 to generate and send an SOS on behalf of the tracking device can also be used to cover multiple different functions. For example, instead of sending an SOS, the master device 104 may send a point of interest (POI) message. For example, a master device 104 may be configured to monitor the location of a fishing boat equipped with a tracking device 102. Once it is known that the boat is moving away from safe international waters and crossing boundaries towards disputed or open waters, the master device 104 may send an alert message with the POI to an appropriate third party. Alternatively or additionally, the master device 104 may send a POI message when it has been determined that the boat equipped with the tracking device 102 has arrived at its intended location.

Another notable benefit of example embodiments disclosed herein is that the master device 104 can seamlessly be paired to monitor more than one tracking device. To initiate pairing between the master device 104 and the tracking device 102, a tracking identification code associated with the tracking device 102 and a pairing code is transmitted to the tracking device 102. The tracking device 102 then validates the pairing code and once the pairing code is validated, the tracking device 102 may be configured to automatically accept the pairing request so as to successfully pair the master device 104 and the tracking device 102.

The tracking identification code associated with the at least one tracking device 102 may be preprogrammed/and or discovered. Using near field wireless communication such as Bluetooth, the master device 104 may be configured to discover one or more tracking devices within Bluetooth range. In some example embodiments, the tracker application 104e of the master device 104 may cause to present a list of discovered tracking devices within Bluetooth range of the master device 104. The master device 104 may be configured to allow for selection of one or more of the discovered tracking devices for pairing.

Additionally or alternatively, the master device 104 may be configured with a predetermined list of tracking identification codes associated with tracking devices of which to pair with. In some embodiments, the tracking device 102 is configured to manually accept via the user interface of the tracking device the request to pair with the master device once the tracking device 102 has determined that the pairing code is valid. In another embodiment, the tracking device 102 may be preprogrammed via a script loaded on the tracking device to automatically accept and confirm successfully pairing once a valid pairing code is received from the master device 104.

Because memory 206 stores detailed location information associated with one or more tracking devices that may be paired to the master device 104, the master device 104 may additionally or alternatively query a database for the intended travel route information and possibly other related information associated with the one or more tracking devices. The travel route information of the tracking device 102 may be provided directly to the requesting master device in response to provision of identifying information gathered from the tracking device 102 (e.g., a tracking device identifier).

Turning now to FIG. 4, the operations facilitating transmitting an alert message in response to a manual request at the tracking device will now be described. One primary context in which the following operations may be useful is in a rescue situation in which a rescue team is on a mission to rescue a soldier or child in which these rescuers are undercover in dangerous locations. In this regard and as described below, the operations of FIG. 4 may be performed by the monitoring device 104 that is paired with a tracking device 102 on at least one member of the rescue team. In this regard, the monitoring device 104 may include means, such as a processor 202, memory 206, communication interface 204, and/or user interface 208 for executing operations described herein. The monitoring device 104 may present, via user interface 208, a tracker app 104e used to monitor the tracking device 102.

The monitoring device 104 may receive an alert message from the tracking device (block 402). The alert message may be a message requesting help or assistance, a message confirmation that the tracking device has reached a point of interest, a message regarding the status of the tracking device, or the like. In some embodiments, the alert message may be in the form of text or may comprise multimedia data such as video, sound, or the like. In some embodiments, the tracking device and the SOS module 102b may be configured to generate and transmit the alert message to the master device 104 or to another tracking device.

The monitoring device 104 then determines a current location of the tracking device as shown in block 404. As described above, the tracking device 102 is equipped with a GPS sensor and/or receiver in order to locate the position of the tracking device using GPS. In such a case, the monitoring device may be configured to receive the location in a data transmission. Alternatively or additionally, the master device 104 may be able to detect the location of the tracking device based on triangulation or the like.

Alternatively or additionally, the current location of the tracking device may be determined by comparing a last known location of the tracking device with an intended route of travel by the tracking device as shown in block 406. For example, the master device 104 may periodically check the location of the tracking device 102 and compare the location to one or more of geographical areas as indicated in the predetermined route. In another embodiment, the comparison can be of the one or more geographical areas that was previously identified as being close to the last known location of the tracking device 102. For example, the master device 104 may not be able to determine the current location of the tracking device 102 as a result of the tracking device being disabled, for example. The master device 104 may then retrieve from memory the last known location of the tracking device along with the intended route of travel by the tracking device. The master device 104 will then compare and determine an area the tracking device 102 may likely be based on the comparison.

Thereafter, as shown in block 408, the master device 104 may transmit the alert message received by the tracking device 102 to a third party and append to the message the determined current location of the tracking device and/or the location the tracking device 102 is most likely to be based on the comparison between the last known location of the tracking device and the intended route of travel by the tracking device. This is beneficial in cases in which the tracking device had triggered an alert message in one location, but may have moved and ended up in another location. For example, a hiker may have triggered an SOS alert message as the hiker loses his or her footing and begins to fall down a mountain. The master device may be configured to retrieve the current location of the hiker after the fall based on the determination that the tracking device has just experienced a fall.

In some implementations, location and position information captured by the master device 104 of the tracking device 102 may be analyzed either in real-time or at a later time to ascertain cues regarding the physical and emotion state of the user of the tracking device 102. These cues may be gathered by way of travel time, status updates, or the like. For example, assuming that a traversed path indicates that the user is injured, the master device 104 may request a status of the user equipped with the tracking device 102. In some embodiments, this analysis may take place at a later time and may be used for training purposes, safe zone identification, or the like. For instance, this information may be used as a comparative tool to identify dangerous and high risk areas.

Turning now to FIG. 5, a series of operations are illustrated that may be performed by the master device 104 in determining whether to initiate monitoring and, if so, whether to transmit an SOS. In this regard, the master device 104 may be embodied by an apparatus 200, such as shown in FIG. 2. The apparatus 200 may include means, such as a processor 202, memory 206, and/or communication interface 204 for executing the operations described in connection with FIG. 5.

In some examples, the master device 104 may be configured to monitor a location of the tracking device 102 (block 502). As previously mentioned above, the master device 104 is configured to monitor the tracking device pinging or otherwise polling the tracking device continuously, periodically or when required such as when specific information regarding the status of the one or more tracking devices is needed and/or is otherwise requested.

In another embodiment, the tracking device is configured to initiate monitoring based on one or more triggers that may result in pinging and/or polling the tracking device with a request so as to get a status or identify the current location of the tracking device. The triggers include a tracking device activity change. For example, the tracking device could have been detected as moving in an alternate direction to its intended route of travel in its last transmission.

Alternatively or additionally, third party data may be used to trigger pinging and/or polling. For example, a monitoring device, such as a gas detector, could indicate the presence of toxic gas levels and such a detection could trigger pinging and/or polling to determine whether any tracking devices are in the vicinity. A trigger may alternatively or additionally include the lack status update received from the tracking device within a predetermined period of time after a request.

The above are examples for triggering monitoring of the tracking device by the master device. Other implementations may be may include different triggers. For example, a master device may be configured to initiate a mass monitoring which triggers an on-demand monitoring for a group of tracking devices which may be the case in which the group is a rescue team unit entering a dangerous environment.

The master device 104 may then determine whether to generate an alert message on behalf of the tracking device (block 504). That is, the master device may automatically or semi-automatically generate an alert on behalf of the tracking device when necessary. The alert may take the form of an SOS or other message that request the authorities, police, fire, rescue, and/or the like to provide service at a particular location.

To determine whether to generate the alert, the master device 104 is configured to determine the intended location of the at least one device. The location may include a point, a region, a route, and/or the like. For example, the intended location may be a particular route, trail, area, city, place of business, point of interest, and/or the like.

The master device 104 is then further configured to compare the location of the at least one device with an intended location of the at least one device (block 508). For example, the system may determine whether the user is within a geographic range of a location, within a geofence, within a boundary, on the route, and/or the like. Based on the location and the intended location, the master device determines that the at least one tracking device is outside a predetermined range from the intended location (block 510).

In some examples, the master device may compare the location of the tracking device 102 with an intended route of travel by the tracking device. The master device 104 is configured to retrieve from memory the intended route of travel by the tracking device 102 so as to determine whether or not the tracking device 102 is on track based on the route.

The master device 104 causes an alert message to be transmitted on behalf of the at least one tracking device (block 510) when the location of the tracking device is outside of the intended location. For example, master device 104 may store an advance alert trigger that instructs processor 202 to transmit the initiated alert message to a third party when the time for the tracking device to send a status is equal to the time the alert trigger time. In the instance, an ok status is received before the alert trigger time, instructions to transmit the alert message are then called off. Otherwise, the alert message is transmitted to a third party.

In some example, the tracking device 102 may be configured with a predetermined reporting status schedule in which the tracking device 102 report a status. For example, a tracking device 102 may be configured with a predetermined reporting schedule of once a day between the hours of 7:00 am to 8:00 am. It is an advantage to provide an expectation of when the master device 104 should receive a status from the tracking device 102 so that whenever the tracking device 102 deviates from the predetermined reporting status schedule by a significant amount of time, the master device may be configured to request a status from the tracking device 102 and trigger transmission of an alert message to a third party should a status update not be received as requested.

In another embodiment the tracking device 102 may be configured to maintain a sleep state. The sleep state is intended to assist satellite or cellular conservation strategies. For example, while using sleep state, the tracking device 102 may be configured to wake every 24 hours to check if a status request has been received from the master device 104 and if a status request has been received, the tracking device 102 will only then send a status.

The master device 104 may be configured to change the reporting status schedule of the tracking device 102. Using the pairing technology described herein, the master device 104 may transmit a message to the tracking device. The message may comprise a new reporting status schedule as inputted via the user interface, the tracker app, or the like of the master device 104. While in sleep state, the tracking device 102 receives the message and wakes up and will be configured to apply the change to its reporting status schedule based on the message. Additionally, the tracking device 102 may send an acknowledgement to the master device 104 that the change to the reporting status schedule has been applied.

The master device 104 may be configured to display on the user interface, the tracker app, or the like a color coded status of transmission of the message. The statuses comprise: sending, confirm, trying/pending. A sending status indicates the message is sent. A confirm status indicates the message has been received by the tracking device and a trying/pending status indicates that the message has failed at least once, but has been resent and placed in a queue to re-transmit the next time the tracking device 102 is scheduled to wake up based on the reporting status schedule.

As noted above, a master device 104 may be paired to one or more tracking devices 102. FIG. 6 shows a pairing algorithm 600 performed by the master device 104. In block 602, the master device 104 is configured to transmit a tracking identification code associated with the at least one tracking device and a pairing code to the at least one tracking device. The tracking identification code is a unique code identifying the tracking device 102. In some embodiments the master device 104 is configured to use Bluetooth technology or the like to discover one or more tracking devices within Bluetooth range of the master device in which to pair with. The master device 104 may use the tracker app 104*e* to view a list of discovered tracking devices and may select one or more of the tracking devices. Additionally or alternatively, the master device 104 may be preprogrammed with one or more tracking identification codes associated with one or more tracking devices to which to pair with. The preprogrammed one or more tracking identifications codes may be listed and displayed in the tracker app 104*e*.

In block 604, the master device is configured to receive confirmation of a successful pairing with the at least one tracking device, the successful pairing being based on a determination that the pairing code is valid. The at least one tracking device may be configured to receive the pairing code and determine whether the pairing code is valid. The at least one tracking device may determine that the pairing code is valid and pairing the master device and the at least one tracking device is successful. In an instance in which the pairing code is determined to be invalid, the master device may be configured to receive a notification of the invalid pairing code and may be permitted to reenter the code for a predetermined number of attempts. In some examples, pairing priority may be configured to prioritize near field communication followed by far field wireless communication that is, for example, Bluetooth or Wi-Fi followed by cellular, satellite, or the like.

Turning now to FIGS. 7*a* and 7*b*, a series of operations are illustrated that may be performed by to initiate an SOS invitation via a master or monitoring device to at least one tracking device. In some example embodiments, the master device or monitoring device, smartphone, or tablet may instantly initiate an SOS or request for the current location of the one or more tracking devices. The master device may also request for a point of interest (POI) or situation awareness information. Situation awareness information may comprise information that may be used to aid the one or more tracking devices. For example, the information may provide an ability to exactly locate or provide for a radius related update request of the tracking device if that is available in addition to the current position/location information of the tracking device. In some embodiments, the one or more tracking devices are unaware that a request for location information has been initiated by the master or monitoring device. That is, the master or monitoring device is able to determine the location of the tracking device without contacting the tracking device directly, such as by accessing a last message sent by the tracking device. Alternatively or additionally, the master or monitoring device may send a message on behalf of the tracking device, such as without receiving a request from the tracking device, based on a detected condition, emergency, location, or the like.

In block 702, the monitoring or master device or smart phone or tablet is configured to trigger or actuate an SOS on behalf of one or more tracking devices. In block 704, the master or monitoring device is configured to check if the SOS is actuated via the tracker app or a hot key. In some embodiments a hot key is a physical key or any triggering parameter used to actuate an SOS. If the SOS is actuated via the hot key, the tracker app is activated and launched (block 706). If the SOS is actuated via the tracker app as indicated in block 708, then the tracker app is considered to already be initiated and is running on the master device or monitoring device or smart phone or tablet (block 710).

The tracker app will then request selection, in some examples, of one or more tracking devices or a fleet of tracking devices to send the SOS to as indicated in block 712. The master or monitoring device is then configured to pull the tracker IDs associated with the selection of tracking devices(s) as shown in block 714.

The tracker application is then configured to check smart algorithm conditions to see a preprogrammed contact/recipient list to push the tracking device location to (block 716). The list of recipients may comprise emergency response units, authorities, lifesaving services, police, fire, friends, family, and/or the like.

If the tracker application determines that a contact should be added (block 718), the contact is added to the recipient list. In some embodiments, the master or monitoring device is configured to pull a list of emergency contacts based on the location of the tracking device so that the tracking device may receive help from those emergency services located close to the tracking device. That is, the system may determine recipients based on the location of the emergency. In some embodiments, when SOS is initiated by the master or monitoring device it could also send additional contract details for tracking device to directly communicate the location to. The master or monitoring device may also send some default messaging such as for example, "this is an SOS initiated by monitoring or master device."

In block 720, the master or monitoring device is configured to send the SOS trigger to the tracking device via a predetermined wireless technology. In some embodiments, the master or monitoring device will run through a prioritized list of wireless technologies to be used. Wireless pairing is then initiated and the tracking device receives the SOS trigger from the master or monitoring device (block 722). In some embodiments, the tracking device is configured to send acknowledgment to the master or monitoring device that the SOS trigger is received (block 724). In some example embodiments, the acknowledgment may be in the form of an alert on the display screen of the device indication SOS initiation has been sent. In yet another embodiment, a color coded indication status of the initiated SOS may be presented. For example, the alert may comprise the text "sending" with yellow color or "retrying" status with amber color or "failed" status with a red color.

In block 728, any contact info to be added is received. In some example embodiments, new contacts may be added via the tracker app. The tracking device, via the GPS module will get the current location of the tracking device and the contact list (block 726). In some embodiments, a message that may be stored in the tracking device which may also be included with the location information of the tracking device to be sent to the identified or predetermined contact/recipient list. As shown in block 730, the tracking device is configured to wake the data modem of the tracking device so as to enable wireless technology to carry location data and any message data previously stored or entered by the tracking device. There is a check for if the master or monitoring device, contact list and whether an emergency response unit has received the location data and the message as depicted in blocks 734, 736, and 738. Blocks 740, 742, and 744 indicate that the location data and message data has been received by the list of contacts which may comprise the master or monitoring device, emergency services such as 911/999, SOS contacts, or the like. In some embodiments, the master or monitoring device is configured to send acknowledgment to the tracking device that the SOS was sent and that help is on the way (block 746).

As shown in block 748, the master or monitoring device/smart phone/tablet may be configured via the tracker app to run a location algorithm. The location algorithm provides for a listing of nearby emergency response services to the location of the tracking device. The master device is then configured to forward the SOS and location information of the tracking device to the identified emergency response services. Optionally, an interactive instant messaging session between the master or monitoring device and the tracking device may be initiated as shown in block 750. The master or monitoring device can analyze SOS location/position data, in real time or in substantially real time, via the tracker application/software running on the monitoring/master/mobile device and be configured to use preloaded analysis data and/or web based or server based data in cloud or connected Internet of Things platform or other data based on configuration settings to send SOS to a nearest emergency center, rescue center, local office or the like. In some embodiments, the master or monitoring device and tracking device is configured to continually send and attempt to send said messages and data until a user has cancelled or a predetermined time has passed for the data or message to be sent. In some embodiments, a color coded status may indicate where the message is sending, received, successful, or any other status that my provide information on the message status to the devices. Once an SOS or location request is received, the tracking device may automatically send location to a preprogrammed contract or only send it the requesting master device or monitoring device. In some embodiments, the SOS may be sent to a contact based on the conditions set during initiation as inputted by the monitoring or master device paired with the tracking device.

In some example embodiments, the monitoring device may process the location and position information of the tracking device in order to determine emergency services located nearest the tracking device. These identified emergency services are added to the recipient/contact list. Optionally, the tracking device may be configured to send and receive interactive messages to the master or monitoring device or another tracking device. The interactive messages may be used for example to provide further detail on the status of the user of the tracking device or may provide helpful instructions to the user of the tracking device. In some embodiments, during SOS operations, interactive data communication with a tracking device is provided for via the user interface of a paired smart phone/tablet to the master or monitoring device. As such, pairing with the smart phone/ tablet provides for enhanced communication capabilities that is otherwise not available with just a tracking device.

In yet another example embodiment, the tracker app is configured to allow selection of one or more tracking devices to trigger SOS messages. The selection of one or more tracking devices may include a group/fleet of tracking devices. The master or monitoring device may select one or more tracking devices or a fleet of tracking devices without any other condition but to check-in on the selected tracking device(s). Example a random check for the location of the lone worker carrying a tracking device may be done as a safety check. In this case a request for location goes via pairing technology and gets the location coordinate of the tracking device and sends to the master device or monitoring device. The tracking device may even not know this request was made by the master or monitoring device.

Turning now to FIGS. 8a and 8b, a series of operations are illustrated that may be performed to initiate request for location information of one or more tracking devices. In block 802, the monitoring or master device is configured to trigger a location request for one or more tracking devices. In some embodiments, the tracker app provides for selection of one or more tracking devices, a group or fleet of tracking devices, all tracking devices, or a combination thereof (block 812) to which the tracking IDs of the selected tracking devices is pulled and may be stored via the tracker app of the master device or monitoring device (block 814). In block 804, the master or monitoring device is configured to check if the SOS or location request is actuated via the tracker app or a hot key. In some embodiments a hot key is a physical key or any triggering parameter used to actuate an SOS or location request. If the SOS or location request is actuated via the hot key, the tracker app is activated and launched (block 806). If the SOS or location request is actuated via the tracker app (block 808), then the tracker app is already initiated and is running on the master device or monitoring device (block 810).

The tracker application is then configured to check smart algorithm conditions to see a preprogrammed contact/recipient list to push the tracking device location to (block 816). The list may comprise of any persons or parties interested in the location of the tracking device. If the tracker application determines that a contact should be added (block 818), the contact is added to the recipient list. The master or monitoring device is then configured to send a location trigger to the tracking device via a programmed wireless technology (820). The wireless pairing is then initiated. If unsuccessful, attempts to pair will continue until cancelled or until a predetermined time has passed to which the pairing request is cancelled. In block 822, the tracking device receives the location request and may send an acknowledgement that a request for location information is received as shown in block 824. In some embodiments, any contact info may be added to the recipient contact list as shown in block 828. In block 826, the GPS module of the tracking device will collect the current location of the tracking device and contact information/recipient information. Optionally, any messages saved to the tracking device may also be included in the location request. In block 830, the tracking device is configured to wake the data communications modem or other communication device so as to use a programmed wireless technology to carry location data and message data as shown in block 832. The location and any message data is then received by the recipient contact list which may include the master or monitoring device which trigged the location request and any identified contacts either entered, captured, or predetermined as depicted in blocks 838 and 840 of FIG. 8.b In some example embodiments, the master or monitoring device or smart phone or tablet is configured to run a location algorithm via the tracker app with the location data of the tracking device and forward the location data to the identified nearest emergency response unit as shown in block 842. In some example embodiments, the location data of the one or more tracking devices may be sent back to the requesting master or monitoring device or could at the same time send a list of the contacts, the one or more tracking devices must respond to with location data. In some embodiments, based on the request and how the tracking device is programmed, the tracking device may or may not extend its response to the list of contacts.

FIG. 9 shows example information screens that visually presents some features of the tracker app such functions to initiate SOS, initiate a location request, selection of one or more tracking devices, a fleet of tracking devices, or all tracking devices. In another embodiment, the tracker app provides for visual status updates such as for example, when the SOS is sending or when the SOS is sent as depicted in the screens on FIG. 9.

FIG. 9 shows another set of example information screens that visually presents some further features of the tracker app such functions represented include sending location request to tracking device(s), pulling contact list which may additionally include the option to add contact(s), forward location data, etc. In another example screen, the tracker app provides for a map displaying the location of selected tracking devices. In yet another screen, the tracker app provides for interactive messaging as displayed in the screens on FIG. 10.

A tracking device that continuously provides its status and/or location information may be very costly or may not be practical. Moreover, there are situations where a user with a tracking device is unable to send an SOS or POI message. Example embodiments described herein reduce money spent on airtime tariff and further provide precise location assessment. For example, for a group of forest fire workers each may be equipped with a tracking device. A master device may monitor the group and send an SOS on behalf of a tracking device determined to be in distress to an emergency rescue unit. The monitoring device may include in the SOS message the precise location of the tracking device. Example embodiments discussed herein thus provide improved and accurate message alerting as well as reducing the likelihood in which situations could end in tragic consequences.

In some example embodiments, once a tracking device receives a SOS trigger or location request, the tracking device is configured to pull the GPS location information and send to the initiator of the request or SOS such as the master device or monitoring device. If the initiator, master device or monitoring device additionally is configured to send an extended contact list during SOS initiation or location request, the tracking device will send location information to the initiator, master device or monitoring device as well as the contact list. In the case where the initiator, master device or monitoring device also is configured to add a command to extend to the contact list stored in the tracking device during its request or if tracking device had been by default programmed to add its local contact list, the tracking device's location information will go to the contacts identified. Each contact on the contact list may comprise a contact's mobile phone number, another tracker ID, initiator/master/monitoring/tracker ID, email address, emergency number, monitoring center, or the like.

In the case where the monitoring or master device or devices or smartphone or tablet instantly initiates SOS once the tracking device or tracking devices has communicated the SOS location, the tracking device may get an acknowledgment to say SOS has reached the initiator or to the contract lists as it may be programmed to do. In some embodiments, the tracking device is programmed not to get acknowledgement and, as such, will not get confirmation that the SOS has reached the listed contacts as well as the imitator. In some embodiments, the tracking device has an LED indicator which may be in form of a special light splash. The tracking device may also be configured to cause a vibration as another type of alert. The tracking device may be programmed with any number of alerting means. In some embodiments the tracking device paired to a smart phone or tablet with the tracker app may also alert the SOS has been sent through as shown by a confirmation on the screen or a pop-up via the tracker app on the paired smart phone or tablet.

In some embodiments, the wireless technology modem of the master device or monitoring device or tracking device is configured to react if it has one or more communication technologies to choose from. A selection process, that may be used to select a communication technology, is disclosed in U.S. application Ser. No. 14/963,369 and U.S. application Ser. No. 14/963,335, the entire contents of which are incorporated by reference herein. In some embodiments, the initiator can request for a specific data technology or technology order with his SOS/location initiation request is transmitted.

In another example embodiment, during several attempts at an unsuccessful pairing, the master or monitoring device will continually try to pair until pairing is successful. In the case where the devices are not within range permitting Bluetooth communication, an alert indicating the master or monitoring device is not in range for pairing may be presented to the master or monitoring device. In some embodiments, during SOS or location information requests, the initiator may optionally push other configuration messages to the one or more tracking devices or fleet of tracking devices. Such configuration messages may be for example, relate to a geofence having a 15 Km that is analyzed ever 2 sec, or a command to generate a siren alert, a request for specific sensor data if tracking device is connected to sensor, modify any configuration including tracking device wakeup or reporting intervals.

It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or enhanced. Furthermore, in some embodiments, additional optional operations may be included. Modifications, additions, or enhancements to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A method comprising:
    monitoring, by a mobile device, a location and an activity status of a tracking device based on receiving an acknowledgement message from the tracking device;
    in response to determining that the tracking device is disabled, generating an estimated location of the tracking device based on a last location of the tracking device and an intended route of travel of the tracking device; and
    in response to determining that a magnitude of a deviation between a route of travel of the tracking device based on the monitored location of the tracking device and the intended route of travel of the tracking device exceeds a predefined threshold, initiating, by the mobile device, an action on the tracking device, wherein the tracking device transmits the location and the activity status only when requested by the monitoring device for the location and the activity status.

2. The method of claim 1, further comprising: in response to determining that the magnitude of the deviation between the route of travel of the tracking device based on at least one of the monitored location or the estimated location of the tracking device and the intended route of travel of the tracking device exceeds the predefined threshold, sending on behalf of the tracking device, by the mobile device, an alert message to a recipient, wherein the alert message comprises at least one of: the monitored location associated with the tracking device, the estimated location associated with the tracking device, a SOS initiation; a tracker location request; and a tracker situation awareness request.

3. The method of claim 1, further comprising:
pairing the mobile device with the tracking device, wherein paring the mobile device with the tracking device comprises:
transmitting a tracking identification code associated with the tracking device and a pairing code to the tracking device; and
receiving confirmation of a successful pairing with the tracking device.

4. The method of claim 1, further comprising:
determining a time for the tracking device to send location information;
comparing the time for the tracking device to send the location information with an alert message trigger time; and
initiating an alert message when the time for the tracking device to send the location information is equal to the alert message trigger time.

5. The method of claim 4, wherein determining the time for the tracking device to send the location information is based on a predetermined reporting status schedule.

6. The method of claim 1, further comprising:
determining a predetermined reporting status schedule of the tracking device, wherein the predetermined reporting status schedule comprises a time for the tracking device to send the activity status;
transmitting a change to the predetermined reporting status schedule; and
receiving an acknowledgement indicating an implementation of the change to the predetermined reporting status schedule.

7. The method of claim 1, further comprising:
based on determining that the tracking device is outside a predefined location boundary, updating a predetermined reporting status schedule to cause an increase in a frequency of sending the acknowledgement message compared to an earlier frequency of sending the acknowledgement message.

8. The method of claim 1, wherein monitoring the location and the activity status of the tracking device is based on at least one of:
receiving the acknowledgement message from the tracking device according to a predetermined reporting status schedule; and
receiving the acknowledgement message from the tracking device in response to a request sent by the mobile device independent of any predetermined reporting status schedule.

9. The method of claim 1, wherein the action initiated by the mobile device on the tracking device includes at least one of: waking up the tracking device, and dynamically updating a predetermined reporting status schedule.

10. The method of claim 1, wherein, when determining the magnitude of the deviation, the method further comprises:
determining whether the deviation between the route of travel of the tracking device and the intended route of travel of the tracking device persists over a time period threshold.

11. An apparatus comprising:
at least one processor; and
at least one memory including computer program code for one or more programs, the at least one memory and the computer program code configured to, with the at least one processor, cause the apparatus to:
monitor a location and an activity status of a tracking device based on receiving an acknowledgement message from the tracking device;
in response to determining that the tracking device is disabled, generate an estimated location of the tracking device based on a last location of the tracking device and an intended route of travel of the tracking device; and
in response to determining that a magnitude of a deviation between a route of travel of the tracking device based on the monitored location of the tracking device and the intended route of travel of the tracking device exceeds a predefined threshold, initiating, by the apparatus, an action on the tracking device, wherein the tracking device transmits the location and the activity status only when requested by the monitoring device for the location and the activity status.

12. The apparatus of claim 11, wherein the at least one memory and the computer program code are configured to, with the at least one processor, cause the apparatus to further: in response to determining that the magnitude of the deviation between the route of travel of the tracking device based on at least one of the monitored location or the estimated location of the tracking device and the intended route of travel of the tracking device exceeds the predefined threshold, sending on behalf of the tracking device, by the apparatus, an alert message to a recipient, wherein the alert message comprising at least one of the monitored location or the estimated location of the tracking device to the recipient.

13. The apparatus of claim 11, wherein, in an instance in which the tracking device is outside a predefined location boundary, the at least one memory and the computer program code are configured to, with the at least one processor, cause the apparatus to further update a predetermined reporting status schedule to cause an increase in a frequency of sending the acknowledgement message compared to an earlier frequency of sending the acknowledgement message.

14. The apparatus of claim 11, wherein, when monitoring the location and the activity status of the tracking device, the at least one memory and the computer program code are configured to, with the at least one processor, cause the apparatus to:
receive the acknowledgement message from the tracking device according to a predetermined reporting status schedule; or
receive the acknowledgement message from the tracking device in response to a request sent by the apparatus independent of any predetermined reporting status schedule.

15. The apparatus of claim 11, wherein the action initiated by the apparatus on the tracking device includes at least one of: waking up the tracking device, and dynamically updating a predetermined reporting status schedule.

16. A computer program product comprising at least one non-transitory computer-readable storage medium having computer-executable program code portions stored therein, the computer-executable program code portions comprising program code instructions for:

monitoring a location and an activity status of a tracking device based on receiving an acknowledgement message from the tracking device;

in response to determining that the tracking device is disabled, generating an estimated location of the tracking device based on a last location of the tracking device and an intended route of travel of the tracking device; and in response to determining that a magnitude of a deviation between a route of travel of the tracking device based on the monitored location of the tracking device and the intended route of travel exceeds a predefined threshold, initiating, by a mobile device, an action on the tracking device, wherein the tracking device transmits the location and the activity status only when requested by the monitoring device for the location and the activity status.

17. The computer program product of claim 16, wherein the computer-executable program code portions comprise the program code instructions for, in response to determining that the magnitude of the deviation between the route of travel of the tracking device based on at least one of the monitored location or the estimated location of the tracking device and the intended route of travel of the tracking device exceeds the predefined threshold, sending on behalf of the tracking device, by the mobile device, an alert message to a recipient, wherein the alert message comprises at least one of the monitored location or the estimated location associated with the tracking device.

18. The computer program product of claim 16, wherein, when monitoring the location and the activity status of the tracking device, the computer-executable program code portions comprise the program code instructions for:

receiving the acknowledgement message from the tracking device according to a predetermined reporting status schedule; or receiving the acknowledgement message from the tracking device in response to a request sent to the tracking device, independent of any predetermined reporting status schedule.

19. The computer program product of claim 16, wherein the computer-executable program code portions comprise the program code instructions for in response to determining that the magnitude of the deviation between the route of travel of the tracking device based on at least one of the monitored location or the estimated location of the tracking device and the intended route of travel of the tracking device exceeds the predefined threshold, sending on behalf of the tracking device, by the mobile device, an alert message to a recipient.

20. The computer program product of claim 16, wherein the computer-executable program code portions comprise the program code instructions for the action initiated by the mobile device on the tracking device wherein the action includes at least one of: waking up the tracking device, and dynamically updating a predetermined reporting status schedule.

* * * * *